US012446066B2

United States Patent
Luo et al.

(10) Patent No.: US 12,446,066 B2
(45) Date of Patent: Oct. 14, 2025

(54) TECHNIQUES FOR SMART REPEATER OPERATIONS IN UNLICENSED BANDS

(71) Applicant: QUALCOMM Incorporated, San Diego, CA (US)

(72) Inventors: Jianghong Luo, Skillman, NJ (US); Xiaoxia Zhang, San Diego, CA (US); Jing Sun, San Diego, CA (US); Navid Abedini, Basking Ridge, NJ (US); Tao Luo, San Diego, CA (US); Junyi Li, Fairless Hills, PA (US); Naeem Akl, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 216 days.

(21) Appl. No.: 17/461,846

(22) Filed: Aug. 30, 2021

(65) Prior Publication Data
US 2023/0067905 A1 Mar. 2, 2023

(51) Int. Cl.
*H04W 74/0808* (2024.01)
*H04W 16/14* (2009.01)
*H04W 72/0446* (2023.01)

(52) U.S. Cl.
CPC ....... *H04W 74/0808* (2013.01); *H04W 16/14* (2013.01); *H04W 72/0446* (2013.01)

(58) Field of Classification Search
CPC ............. H04W 74/0808; H04W 16/14; H04W 72/0446; H04W 76/14; H04W 88/04; H04W 92/18; H04W 84/047; H04B 7/15
See application file for complete search history.

(56) References Cited

U.S. PATENT DOCUMENTS

| | | | |
|---|---|---|---|
| 2018/0054237 A1* | 2/2018 | Tseng | H04W 36/0022 |
| 2020/0107373 A1* | 4/2020 | Roy | H04W 74/0833 |
| 2020/0314891 A1* | 10/2020 | Li | H04W 74/006 |
| 2020/0329498 A1* | 10/2020 | Wang | H04W 16/14 |
| 2020/0351669 A1* | 11/2020 | Xu | H04W 4/70 |

(Continued)

OTHER PUBLICATIONS

Hu et al., "Receiver Assisted Listen Before Talk in NR-U 60GHz", U.S. Appl. No. 63/230,441, filed Aug. 6, 2021 (Year: 2021).*

(Continued)

*Primary Examiner* — Thinh D Tran
(74) *Attorney, Agent, or Firm* — Holland & Hart LLP

(57) ABSTRACT

Methods, systems, and devices for wireless communications are described. A relay device operating in an unlicensed radio frequency (RF) spectrum band may receive a channel occupancy time (COT) indication from a first wireless device via a control message, a preamble sequence, or an on-off energy pattern, among other examples. Upon receiving the COT indication from the first wireless device, the relay device may perform a listen before talk (LBT) procedure. If the LBT procedure is successful, the relay device may relay signals between the first wireless device and the second wireless device. Otherwise, the relay device may refrain from relaying signals between the first wireless device and the second wireless device. The described techniques may enable the relay device to operate with greater efficiency and reduced power consumption. The described techniques may also improve the reliability of communications between the first wireless device and the second wireless device.

30 Claims, 18 Drawing Sheets

(56) References Cited

U.S. PATENT DOCUMENTS

| | | | |
|---|---|---|---|
| 2021/0045096 A1* | 2/2021 | Xue | H04W 74/0833 |
| 2022/0015143 A1* | 1/2022 | Tiirola | H04W 72/0446 |
| 2022/0124806 A1* | 4/2022 | Hu | H04W 72/1263 |
| 2023/0180293 A1* | 6/2023 | Calcev | H04W 16/14 |
| | | | 370/328 |
| 2023/0232457 A1* | 7/2023 | Hu | H04W 74/0866 |
| | | | 370/329 |
| 2024/0098638 A1* | 3/2024 | Chen | H04W 52/0216 |

OTHER PUBLICATIONS

Hu et al., "Message-based Receiver Assisted Listen Before Talk", U.S. Appl. No. 63/225,750, filed Jul. 26, 2021 (Year: 2021).*

* cited by examiner

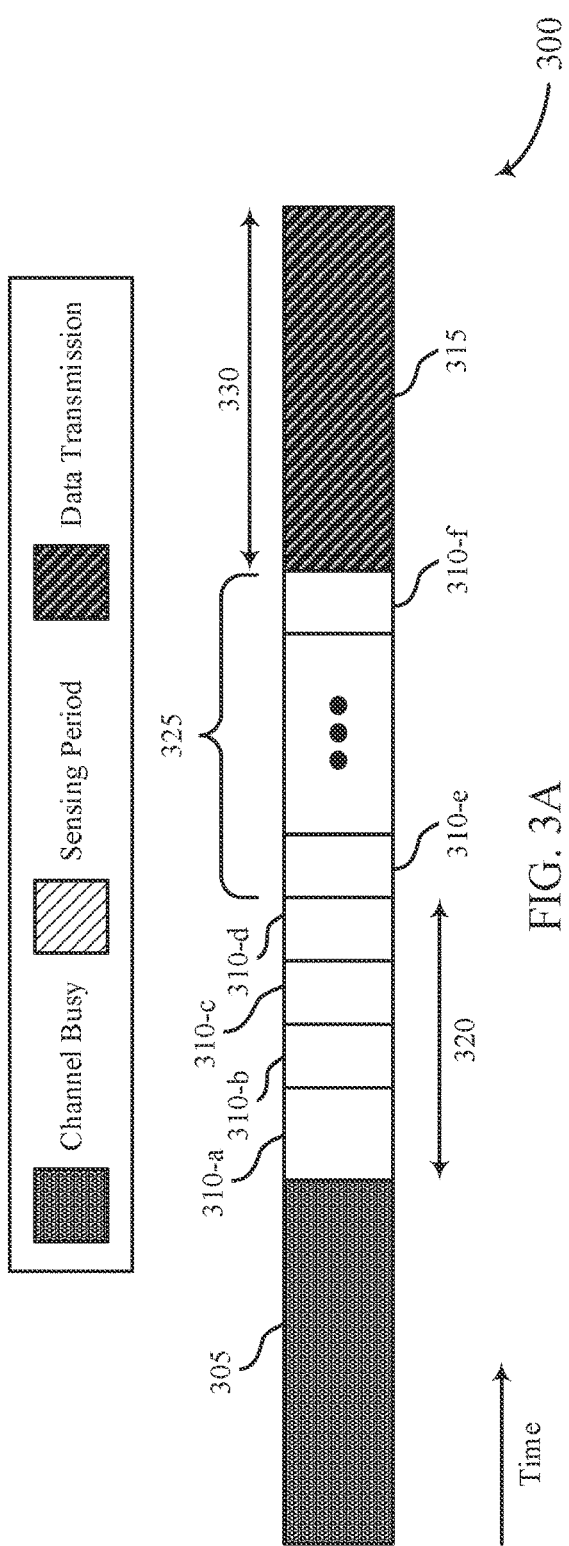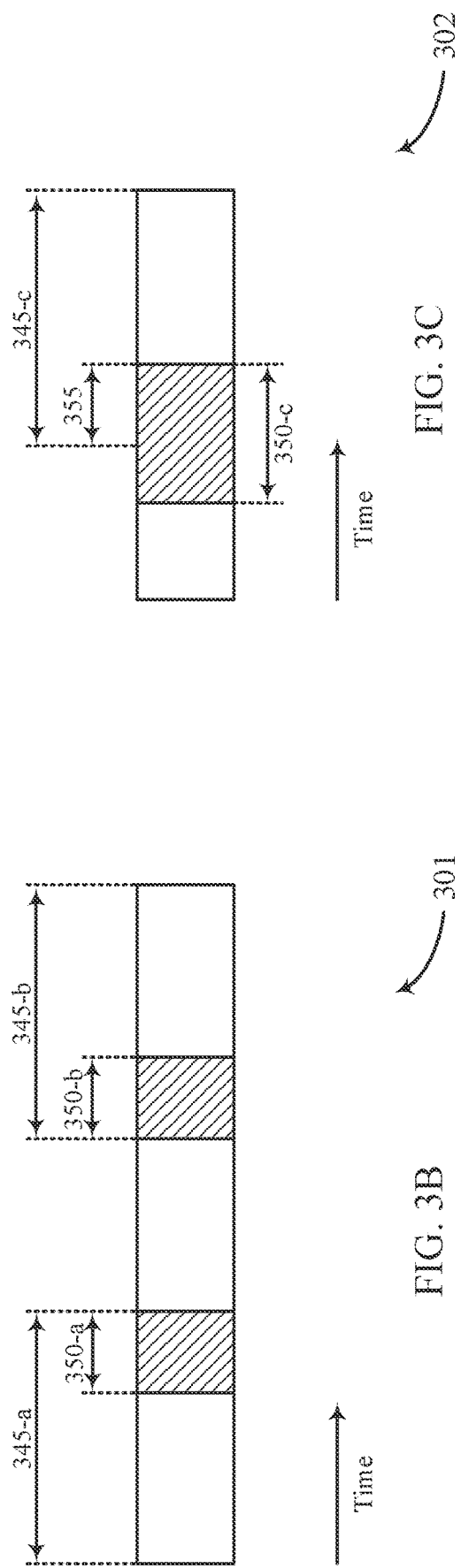
FIG. 3A
FIG. 3B
FIG. 3C

TECHNIQUES FOR SMART REPEATER OPERATIONS IN UNLICENSED BANDS

FIELD OF TECHNOLOGY

The following relates to wireless communications, including techniques for smart repeater operations in unlicensed bands.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal FDMA (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Some wireless communications systems may employ relay devices to provide coverage or capability enhancements. Some relay devices may amplify and forward signals from between wireless devices to improve the likelihood of successful communications between the wireless devices. In some cases, however, a relay device may be unable to distinguish between data (e.g., signals transmitted by the wireless devices) and noise (e.g., interference, signals transmitted by other wireless devices). In such cases, the relay device may amplify and forward the noise, which may reduce the reliability of communications between the wireless devices.

SUMMARY

The described techniques relate to improved methods, systems, devices, and apparatuses that support improved relay operations in unlicensed bands. Generally, the described techniques provide for improving the reliability of communications in unlicensed radio frequency (RF) spectrum bands. In accordance with the described techniques, a relay device may receive a channel occupancy time (COT) indication from a first wireless device or a second wireless device, and may perform a listen before talk (LBT) procedure based on receiving the COT indication. If the relay device passes the LBT procedure, the relay device may relay signals between the first wireless device and the second wireless device over a channel in an unlicensed RF spectrum band. Alternatively, if the LBT procedure is unsuccessful, the relay device may refrain from relaying signals between the first wireless device and the second wireless device. The described techniques may enable the relay device to operate with improved efficiency and reduced power consumption. The described techniques may also increase the likelihood of successful communications between the first wireless device and the second wireless device.

A method for wireless communications at a relay device is described. The method may include receiving an indication that a first wireless device or a second wireless device is occupying a channel in an unlicensed RF spectrum band, performing an LBT procedure on the channel based on receiving the indication, and relaying signals between the first wireless device and the second wireless device over the channel based on the relay device passing the LBT procedure.

An apparatus for wireless communications at a relay device is described. The apparatus may include a processor, memory coupled with the processor, and instructions stored in the memory. The instructions may be executable by the processor to cause the apparatus to receive an indication that a first wireless device or a second wireless device is occupying a channel in an unlicensed RF spectrum band, perform an LBT procedure on the channel based on receiving the indication, and relay signals between the first wireless device and the second wireless device over the channel based on the relay device passing the LBT procedure.

Another apparatus for wireless communications at a relay device is described. The apparatus may include means for receiving an indication that a first wireless device or a second wireless device is occupying a channel in an unlicensed RF spectrum band, means for performing an LBT procedure on the channel based on receiving the indication, and means for relaying signals between the first wireless device and the second wireless device over the channel based on the relay device passing the LBT procedure.

A non-transitory computer-readable medium storing code for wireless communications at a relay device is described. The code may include instructions executable by a processor to receive an indication that a first wireless device or a second wireless device is occupying a channel in an unlicensed RF spectrum band, perform an LBT procedure on the channel based on receiving the indication, and relay signals between the first wireless device and the second wireless device over the channel based on the relay device passing the LBT procedure.

In some examples of the method, apparatuses, and non-transitory computer-readable medium described herein, receiving the indication may include operations, features, means, or instructions for receiving an indication of a COT for the first wireless device or the second wireless device, where relaying signals between the first wireless device and the second wireless device is based on the COT.

In some examples of the method, apparatuses, and non-transitory computer-readable medium described herein, relaying signals between the first wireless device and the second wireless device may include operations, features, means, or instructions for determining to relay signals in a first relay direction from the first wireless device to the second wireless device, a second relay direction from the second wireless device to the first wireless device, or both based on the indication, information acquired by the relay device prior to receiving the indication, or both and relaying, during the COT and after passing the LBT procedure, signals in the first relay direction, the second relay direction, or both based on the determining.

In some examples of the method, apparatuses, and non-transitory computer-readable medium described herein, relaying signals between the first wireless device and the second wireless device may include operations, features, means, or instructions for relaying signals between the first wireless device and the second wireless device during a first portion of the COT and deactivating one or more RF chains of the relay device during a second portion of the COT.

In some examples of the method, apparatuses, and non-transitory computer-readable medium described herein, relaying signals between the first wireless device and the second wireless device may include operations, features, means, or instructions for relaying signals between the first wireless device and the second wireless device based on a maximum COT for the first wireless device or the second wireless device.

In some examples of the method, apparatuses, and non-transitory computer-readable medium described herein, relaying signals between the first wireless device and the second wireless device may include operations, features, means, or instructions for relaying signals between the first wireless device and the second wireless device in accordance with an amplify and forward communication scheme.

In some examples of the method, apparatuses, and non-transitory computer-readable medium described herein, receiving the indication may include operations, features, means, or instructions for receiving, from the first wireless device or the second wireless device, control signaling that indicates a COT for the first wireless device or the second wireless device, a radio network temporary identifier (RNTI) of the relay device, a downlink control information (DCI) field value associated with the relay device, an uplink control information (UCI) field value associated with the relay device, relay direction information, time division duplexing (TDD) information, or a combination thereof and determining that the relay device is to relay signals between the first wireless device and the second wireless device based on the control signaling.

In some examples of the method, apparatuses, and non-transitory computer-readable medium described herein, receiving the indication may include operations, features, means, or instructions for receiving, from the first wireless device or the second wireless device, a preamble sequence that indicates a COT for the first wireless device or the second wireless device, where relaying signals between the first wireless device and the second wireless device is based on receiving the preamble sequence.

Some examples of the method, apparatuses, and non-transitory computer-readable medium described herein may further include operations, features, means, or instructions for receiving control signaling that indicates a set of configuration parameters related to the preamble sequence, a set of preconfigured preamble sequences, or both, where receiving the preamble sequence is based on the control signaling.

In some examples of the method, apparatuses, and non-transitory computer-readable medium described herein, receiving the indication may include operations, features, means, or instructions for detecting an energy pattern that indicates a COT for the first wireless device or the second wireless device, where the energy pattern includes a frequency-based energy pattern or a time-based energy pattern, and determining that the relay device is to relay signals between the first wireless device and the second wireless device based on detecting the energy pattern.

Some examples of the method, apparatuses, and non-transitory computer-readable medium described herein may further include operations, features, means, or instructions for receiving control signaling that indicates a set of energy thresholds, a set of preconfigured energy patterns, or both, where detecting the energy pattern is based on the control signaling.

In some examples of the method, apparatuses, and non-transitory computer-readable medium described herein, receiving the indication may include operations, features, means, or instructions for receiving an indication of an LBT procedure type for the relay device, where performing the LBT procedure is based on the LBT procedure type.

Some examples of the method, apparatuses, and non-transitory computer-readable medium described herein may further include operations, features, means, or instructions for transmitting a message that indicates a result of the LBT procedure, where relaying signals between the first wireless device and the second wireless device is based on transmitting the message.

Some examples of the method, apparatuses, and non-transitory computer-readable medium described herein may further include operations, features, means, or instructions for determining that the channel is occupied based on performing the LBT procedure and refraining from relaying signals between the first wireless device and the second wireless device over the channel based on determining that the channel is occupied.

In some examples of the method, apparatuses, and non-transitory computer-readable medium described herein, relaying signals between the first wireless device and the second wireless device may include operations, features, means, or instructions for relaying signals between the first wireless device and the second wireless device based on a preconfigured time offset from the indication.

In some examples of the method, apparatuses, and non-transitory computer-readable medium described herein, the first wireless device includes a base station and the second wireless device includes a user equipment (UE).

In some examples of the method, apparatuses, and non-transitory computer-readable medium described herein, the first wireless device includes a first UE and the second wireless device includes a second UE.

A method for wireless communications at a first wireless device is described. The method may include performing an LBT procedure on a channel in an unlicensed RF spectrum band, transmitting an indication that the first wireless device is occupying the channel based on the first wireless device passing the LBT procedure, and communicating with a second wireless device via a relay device based on transmitting the indication.

An apparatus for wireless communications at a first wireless device is described. The apparatus may include a processor, memory coupled with the processor, and instructions stored in the memory. The instructions may be executable by the processor to cause the apparatus to perform an LBT procedure on a channel in an unlicensed RF spectrum band, transmit an indication that the first wireless device is occupying the channel based on the first wireless device passing the LBT procedure, and communicate with a second wireless device via a relay device based on transmitting the indication.

Another apparatus for wireless communications at a first wireless device is described. The apparatus may include means for performing an LBT procedure on a channel in an unlicensed RF spectrum band, means for transmitting an indication that the first wireless device is occupying the channel based on the first wireless device passing the LBT procedure, and means for communicating with a second wireless device via a relay device based on transmitting the indication.

A non-transitory computer-readable medium storing code for wireless communications at a first wireless device is described. The code may include instructions executable by a processor to perform an LBT procedure on a channel in an unlicensed RF spectrum band, transmit an indication that the first wireless device is occupying the channel based on the first wireless device passing the LBT procedure, and communicate with a second wireless device via a relay device based on transmitting the indication.

In some examples of the method, apparatuses, and non-transitory computer-readable medium described herein, transmitting the indication may include operations, features, means, or instructions for transmitting an indication of a COT for the first wireless device or the second wireless device, where communicating with the second wireless device via the relay device is based on the COT.

In some examples of the method, apparatuses, and non-transitory computer-readable medium described herein, transmitting the indication may include operations, features, means, or instructions for transmitting, to the relay device, an indication to relay signals in a first relay direction from the first wireless device to the second wireless device, a second relay direction from the second wireless device to the first wireless device, or both.

In some examples of the method, apparatuses, and non-transitory computer-readable medium described herein, transmitting the indication may include operations, features, means, or instructions for transmitting an indication that the relay device is to relay signals between the first wireless device and the second wireless device in accordance with an amplify and forward communication scheme.

In some examples of the method, apparatuses, and non-transitory computer-readable medium described herein, transmitting the indication may include operations, features, means, or instructions for transmitting control signaling that indicates a COT for the first wireless device or the second wireless device, a RNTI of the relay device, a DCI field value associated with the relay device, a UCI field value associated with the relay device, relay direction information, TDD information, or a combination thereof, where communicating with the second wireless device via the relay device is based on the control signaling.

In some examples of the method, apparatuses, and non-transitory computer-readable medium described herein, transmitting the indication may include operations, features, means, or instructions for transmitting control signaling that indicates a set of preamble sequence configuration parameters, a set of preconfigured preamble sequences, or both and transmitting, in accordance with the control signaling, a preamble sequence that indicates a COT for the first wireless device or the second wireless device.

In some examples of the method, apparatuses, and non-transitory computer-readable medium described herein, transmitting the indication may include operations, features, means, or instructions for transmitting control signaling that indicates a set of energy thresholds, a set of preconfigured energy patterns, or both and transmitting, in accordance with the control signaling, an energy pattern that indicates a COT for the first wireless device or the second wireless device.

In some examples of the method, apparatuses, and non-transitory computer-readable medium described herein, transmitting the indication may include operations, features, means, or instructions for transmitting an indication of an LBT procedure type for the relay device, where communicating with the second wireless device via the relay device is based on the LBT procedure type.

Some examples of the method, apparatuses, and non-transitory computer-readable medium described herein may further include operations, features, means, or instructions for receiving, from the relay device, a message that indicates a result of an LBT procedure performed by the relay device and determining whether to communicate with the second wireless device via the relay device based on the result of the LBT procedure performed by the relay device.

In some examples of the method, apparatuses, and non-transitory computer-readable medium described herein, communicating with the second wireless device via the relay device may include operations, features, means, or instructions for communicating with the second wireless device via the relay device based on a preconfigured time offset from the indication.

BRIEF DESCRIPTION OF THE DRAWINGS

FIGS. 3A, 3B, and 3C illustrate examples of listen before talk (LBT) procedures that support techniques for smart repeater operations in unlicensed bands in accordance with aspects of the present disclosure.

DETAILED DESCRIPTION

Figure 1:
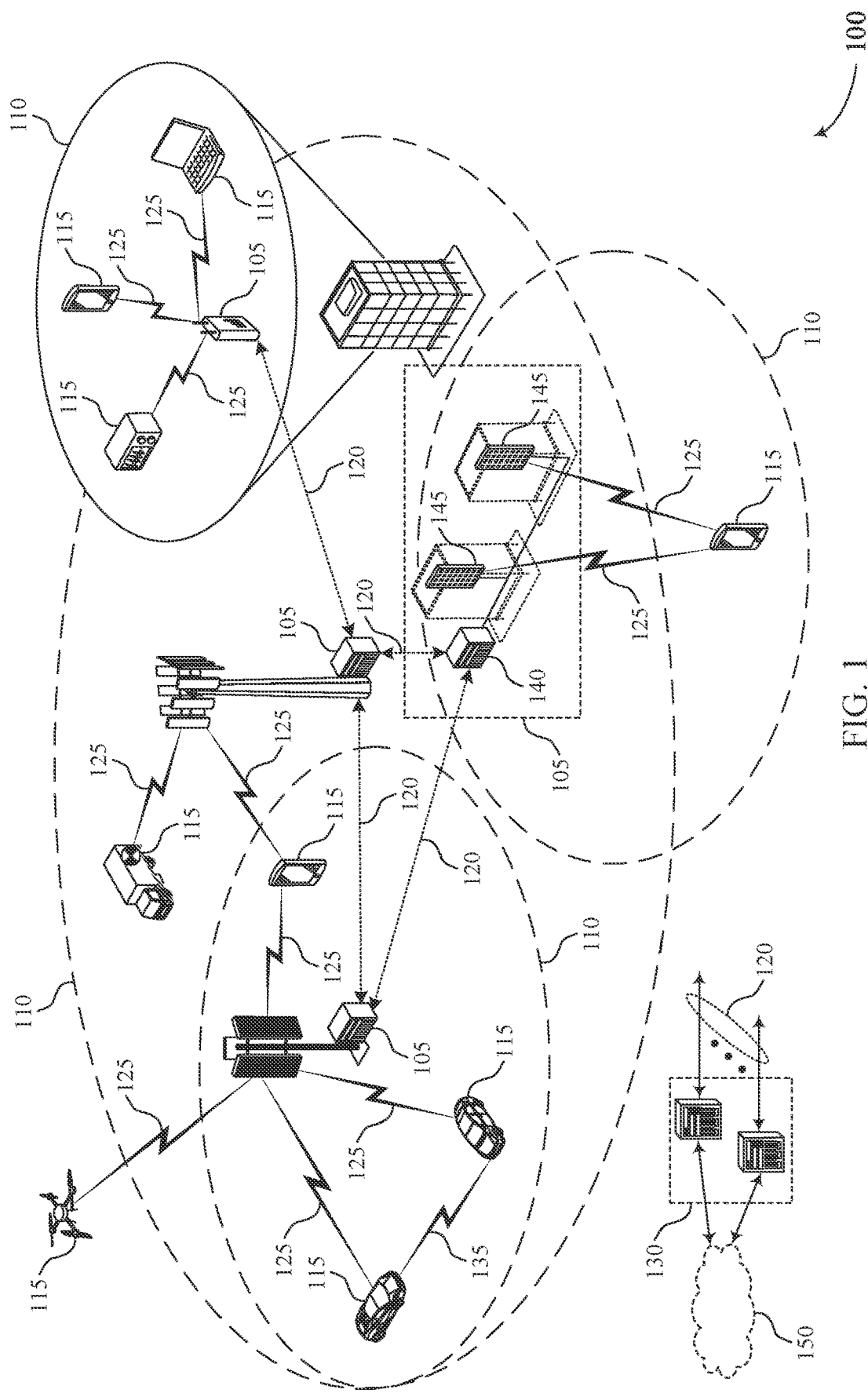
FIGS. 1 and 2 illustrate examples of wireless communications systems that support techniques for smart repeater operations in unlicensed bands in accordance with aspects of the present disclosure.

Some wireless communications systems may employ relay devices to provide coverage or capability enhancements in unlicensed radio frequency (RF) spectrum bands. For example, a relay device may relay (e.g., amplify and forward, decode and forward, reflect) signals between wireless devices over a channel in an unlicensed RF spectrum band. Using the relay device to relay signals between the wireless devices may improve the likelihood of the wireless devices successfully receiving these signals (e.g., in comparison to the wireless devices communicating over a direct communication link).

In some cases, however, the relay device may be unable to distinguish between data (e.g., signals transmitted by the wireless devices) and noise (e.g., interference, signals transmitted by other wireless devices). As a result, the relay device may relay noise (e.g., rather than data) between the wireless devices, which may reduce the likelihood of successful communications between the wireless devices. In some cases, the relay device may also be configured to remain in an active state (e.g., regardless of traffic levels or scheduling information), which may result in higher power consumption at the relay device. That is, the relay device may be unable to conserve power during low-traffic periods (e.g., by entering a low-power state or deactivating one or more RF chains of the relay device).

In accordance with aspects of the present disclosure, a relay device may operate with greater reliability and reduced power consumption based on receiving an indication that one or both of a first wireless device (e.g., a base station or a user equipment (UE)) and a second wireless device (e.g., a base station or a UE) are occupying a channel in an unlicensed RF spectrum. Specifically, the relay device may receive control information (e.g., downlink control information (DCI) or uplink control information (UCI)), a preamble sequence, or an energy pattern indicating a channel occupancy time (COT) for the first wireless device or the second wireless device. Accordingly, the relay device may perform a listen before talk (LBT) procedure based on receiving the indication, and may relay (e.g., amplify and forward) signals between the first wireless device and the second wireless device (e.g., during the COT) based on a result of the LBT procedure.

In some examples, the relay device may shut off (e.g., enter a low-power state) after relaying signals between the first wireless device and the second wireless device, which may reduce power consumption at the relay device. Additionally or alternatively, the relay device may refrain from relaying signals between the first wireless device and the second wireless device if the LBT procedure is unsuccessful (e.g., if the channel is occupied), which may reduce the likelihood of the relay device amplifying noise. In some examples, the relay device may indicate a result of the LBT procedure to the first wireless device or the second wireless device, and the first wireless device or the second wireless device may determine whether to use the relay device (e.g., for subsequent communications) based on the result of the LBT procedure.

Aspects of the present disclosure may be implemented to realize one or more of the following advantages. The described techniques may enable a relay device to operate (e.g., in an unlicensed RF spectrum band) with reduced power consumption based on receiving an indication of a COT from one or more wireless devices. For example, if the relay device receives an indication of a COT from a first wireless device, the relay device may relay signals between the first wireless device and a second wireless device during the COT, and may operate in a low-power state outside of (e.g., before, after) the COT. In addition, the relay device may perform an LBT procedure before relaying signals between the first wireless device and the second wireless device, which may reduce the likelihood of the relay device relaying noise (e.g., rather than data) between the first wireless device and the second wireless device. Also, the relay device may refrain from relaying signals between the first wireless device and the second wireless device if the LBT procedure is unsuccessful (e.g., if the channel is occupied), which may reduce power consumption at the relay device, among other benefits.

Aspects of the disclosure are initially described in the context of wireless communications systems, LBT procedure types, and process flows. Aspects of the disclosure are further illustrated by and described with reference to apparatus diagrams, system diagrams, and flowcharts that relate to techniques for smart repeater operations in unlicensed bands.

FIG. 1 illustrates an example of a wireless communications system 100 that supports techniques for smart repeater operations in unlicensed bands in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of RF spectrum resources having a defined physical layer structure for supporting the communication links 125. For example, a carrier used for a communication link 125 may include a portion of a RF spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the RF spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may include one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a RF spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC). The UEs 115 may be designed to support ultra-reliable, low-latency, or critical functions. Ultra-reliable communications may include private communication or group communication and may be supported by one or more services such as push-to-talk, video, or data. Support for ultra-reliable, low-latency functions may include prioritization of services, and such services may be used for public safety or general commercial applications. The terms ultra-reliable, low-latency, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed RF spectrum bands. For example, the wireless communications system 100 may employ License Assisted Access (LAA), LTE-Unlicensed (LTE-U) radio access technology, NR-Unlicensed (NR-U) radio access technology, or NR technology in an unlicensed band such as the 5 GHz industrial, scientific, and medical (ISM) band. When operating in unlicensed RF spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support RF beamforming for a signal transmitted via an antenna port.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

Some wireless communications systems may employ relay devices, equivalently referred to herein as relay nodes, to provide coverage or capability enhancements. Relay devices may be simple and cost-effective devices that can improve network coverage. Relay devices may include repeaters (e.g., amplify and forward relay nodes), decode and forward relay nodes, reconfigurable intelligent surfaces (RISs), or integrated access and backhaul (IAB) nodes, among other examples. A repeater may receive signals (e.g., bi-directional traffic) from wireless devices, amplify the signals, and forward the signals to other wireless devices (e.g., destination nodes) in the analog domain.

Some repeaters may operate without any side information. Other repeaters (e.g., smart repeaters) may be capable of acquiring side information. For example, some repeaters may be capable of acquiring timing information (e.g., slot or symbol boundaries), on-off scheduling information (e.g., slots or symbols in which communications are scheduled), spatial information (e.g., for beam management), or uplink and downlink TDD information, among other examples. The repeaters may use this side information to operate with improved efficiency. For example, a repeater may acquire on-off scheduling information and determine that there are no upcoming transmissions between a base station and a UE. Accordingly, the repeater may turn off (e.g., deactivate one or more RF chains) to conserve power. In another example, a repeater may acquire spatial information related to a location of a UE. Accordingly, the repeater may use a narrow beam to forward signals towards the location of the UE.

Repeaters may acquire side information by receiving or decoding broadcast channel transmissions (e.g., synchronization signal blocks (SSBs), remaining minimum system information (RMSI), system information blocks (SIBs)) from a base station 105. Alternatively, some repeaters (e.g., network-controlled smart repeaters) may be configured or otherwise controlled by a base station 105 via an established control interface. In some examples, a network-controlled smart repeater may include a specific function (e.g., an MT function) that is capable of receiving control signaling directly from a base station 105. Some repeaters may have a processing latency on the order of nanoseconds (ns), and may be capable of performing full-duplex communications (e.g., simultaneous reception and transmission).

Some wireless communications systems may also support communications in unlicensed RF spectrum bands (e.g., sub-6 GHz, 60 GHz). When communicating in an unlicensed RF band (e.g., NR-U), a wireless device (equivalently referred to herein as a wireless node) may be configured to perform an LBT procedure (e.g., a clear channel assessment (CCA)) prior to using a channel in the unlicensed RF band. A wireless device may be configured to perform various types of LBT procedures, which may be based on energy detection. For example, a wireless device may be configured to perform a category 1 (CAT-1) LBT, in which the wireless device may not perform an LBT procedure prior to transmission. A wireless device may perform a CAT-1 LBT if, for example, a gap between transmissions from the wireless device is below a threshold, or if a length of a transmission from the wireless device is below a threshold, among other examples. In some unlicensed RF spectrum bands (e.g., sub-6 GHz NR-U bands), a CAT-1 LBT may correspond to a Type 2C LBT procedure.

A wireless device may also be configured to perform a category 2 (CAT-2) LBT procedure, in which the wireless device performs an LBT procedure with a fixed sensing duration. For sub-6 GHz NR-U bands, a CAT-2 LBT procedure may correspond to a Type 2A LBT procedure (as described with reference to FIG. 3B) or a Type 2B LBT procedure (as described with reference to FIG. 3C) with a fixed sensing duration of 25 microseconds (µs) or 16 µs. Alternatively, a wireless device may be configured to perform a category 3 (CAT-3) LBT procedure, in which the wireless device performs an LBT procedure with random backoff using a contention window of a fixed size. For higher bands (e.g., 60 GHz), a CAT-3 LBT procedure may correspond to a predefined CCA procedure. In other examples, a wireless device may be configured to perform a category 4 (CAT-4) LBT procedure, in which the wireless device performs an LBT procedure with random backoff using a contention window of a variable size. For sub-6 GHz NR-U bands, a CAT-4 LBT procedure may correspond to a Type 1 LBT procedure (as described with reference to FIG. 3A).

Some wireless communications systems may support repeater operations in NR-U bands for coverage or capability enhancements. In some deployments, a repeater may be configured to remain in an active state (e.g., always-on) in NR-U bands without performing an LBT procedure. In such deployments, LBT procedures performed by other wireless devices (e.g., base stations 105 or UEs 115) may account for the repeater. To support repeater operations in these bands, two sets of LBT energy thresholds can be defined or configured for wireless devices. For example, a first set of LBT energy thresholds can be used for communications associated with a repeater, and a second set of LBT energy thresholds can be used for communications without a repeater. In some cases, the first set of LBT energy thresholds can be lower than the second set of LBT energy thresholds to account for the extended coverage range provided by a repeater. In some cases, however, configuring a repeater to remain in an active state while operating in NR-U bands may not comply with regulations. Moreover, even if such behavior does comply with regulations, the repeater may amplify and forward noise or interference when a wireless device (e.g., a base station 105 or a UE 115) is gated off (e.g., due to an LBT failure or low traffic volume), which may adversely affect performance of the system.

Aspects of the present disclosure provide for improving the reliability and efficiency of wireless communications in unlicensed RF spectrum bands based on configuring a relay device (e.g., a smart repeater) to perform an LBT procedure prior to relaying signals between wireless devices over a channel in an unlicensed RF spectrum band. The relay device may perform the LBT procedure based on receiving an indication of a COT from a first wireless device. After receiving the indication of the COT, the relay device may perform an LBT procedure and may relay signals between the first wireless device and a second wireless device based on a result of the LBT procedure (e.g., if the LBT procedure is successful). In some examples, the relay device may relay signals in accordance with a two-directional (e.g., blind) communication scheme. In other examples, the relay device may receive side information (e.g., uplink or downlink TDD information, slot format indicator (SFI) information) from the first wireless device or the second wireless device and may determine one or more relay directions based on the side information. For example, the relay device may determine to relay signals in a first relay direction from the first wireless device to the second wireless device, a second relay direction from the second wireless device to the first wireless device, or both based on the side information. In some examples, the side information may be included in the COT indication from the first wireless device. In other examples, the side information may be acquired by the relay device prior to reception of the COT indication.

Configuring the relay device to perform an LBT procedure prior to relaying signals between the first wireless device and the second wireless device may decrease power consumption at the relay device and improve the reliability of communications between the first wireless device and the second wireless device, among other benefits. More specifically, configuring the relay device to perform an LBT procedure based on receiving an indication of a COT from the first wireless device may enable the relay device to enter a low-power mode outside of (e.g., before, after) the COT, which may result in greater power savings at the relay device. In addition, configuring the relay device to perform an LBT procedure prior to relaying signals between the first wireless device and the second wireless device may reduce the likelihood of the relay device amplifying noise (e.g., interference, signals from other wireless devices), which may increase the likelihood of successful communications between the first wireless device and the second wireless device, among other benefits.

Figure 2:
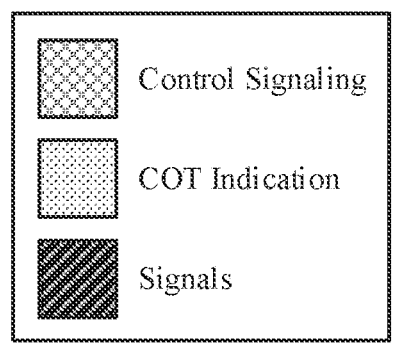
Figure 2:
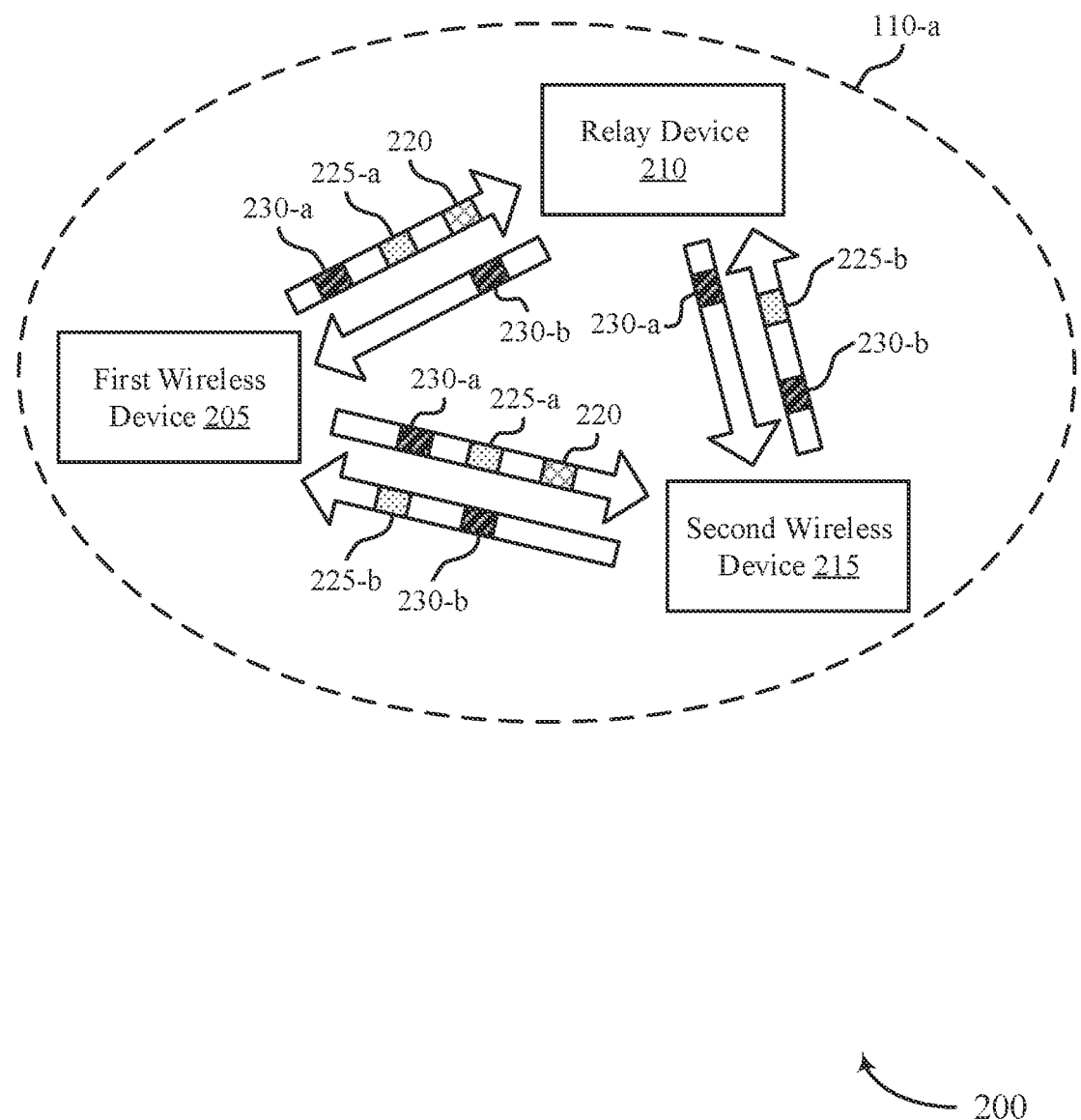

FIG. 2 illustrates an example of a wireless communications system 200 that supports techniques for smart repeater operations in unlicensed bands in accordance with aspects of the present disclosure. The wireless communications system 200 may implement or be implemented by aspects of wireless communications system 100. For example, the wireless communications system 200 may include a first wireless device 205 and a second wireless device 215, which may be examples of a UE 115 or a base station 105 described with reference to FIG. 1. The wireless communications system 200 may also include a relay device 210, which may be an example of a relay device (e.g., a smart repeater) described with reference to FIG. 1. The first wireless device 205 and the second wireless device 215 may communicate (e.g., via the relay device 210) within a geographic coverage area 110-*a*, which may be an example of a geographic coverage area 110 described with reference to FIG. 1. In the wireless communications system 200, the relay device 210 may perform an LBT procedure based on receiving COT indications 225 from one or both of the first wireless device 205 and the second wireless device 215. Accordingly, the relay device 210 may relay (e.g., amplify and forward) signals 230 between the first wireless device 205 and the second wireless device 215 based on a result of the LBT procedure.

As described with reference to FIG. 1, some wireless communications systems may employ repeaters to improve network coverage. To amplify signals, a repeater may transmit with non-negligible power (e.g., similar to a UE). When operating in unlicensed RF spectrum bands, repeater transmissions may be subject to LBT regulations (e.g., similar to transmission/reception point (TRP) or UE transmissions). In some cases, wireless devices (e.g., base stations or UEs) may be configured to perform an LBT procedure prior to performing downlink or uplink transmissions. When such transmissions are gated off (e.g., due to LBT failure), a repeater may amplify noise or interference, which may result in higher power consumption (e.g., at the repeater) and lower communication reliability (e.g., between the wireless devices).

Aspects of the present disclosure provide for reducing the likelihood of the relay device 210 (e.g., an autonomous smart repeater or a network-controlled smart repeater) amplifying noise or interference between the first wireless device 205 and the second wireless device 215 when one or both of the first wireless device 205 and the second wireless device 215 are gated off due to LBT failures or low traffic levels. Specifically, aspects of the present disclosure provide for configuring the relay device 210 to identify a window (e.g., a time duration) in which to perform amplify and forward operations based on receiving COT indications 225 from the first wireless device 205 and the second wireless device 215. Accordingly, the relay device 210 may perform an LBT procedure based on receiving the COT indications 225, and may perform amplify and forward operations (e.g., between the first wireless device 205 and the second wireless device 215) if the LBT procedure is successful. The described techniques may result in fewer extraneous transmissions from the relay device 210, among other benefits.

The relay device 210 may determine if at least one of the first wireless device 205 (e.g., a base station or a UE) or the second wireless device 215 (e.g., a base station or a UE) is within COT based on receiving the COT indications 225. For example, the relay device 210 may receive a COT indication 225-*a* from the first wireless device 205. Additionally or alternatively, the relay device 210 may receive a COT indication 225-*b* from the second wireless device 215. If the relay device 210 determines that the first wireless device 205 or the second wireless device 215 has initiated a COT (e.g., based on the COT indications 225), the relay device 210 may perform an LBT procedure, and may perform amplify and forward operations between the first wireless device 205 and the second wireless device 215 if the relay device 210 passes the LBT procedure. For example, the relay device 210 may amplify and forward a signal 230-*a* in a first relay direction from the first wireless device 205 to the second wireless device 215. Additionally or alternatively, the relay device 210 may amplify and forward a signal 230-*b* in a second relay direction from the second wireless device 215 to the first wireless device 205.

In some examples, the first wireless device 205 may transmit the COT indication 225-*a*, the signal 230-*a*, or both to the second wireless device 215 over a direct communication link. Likewise, the second wireless device 215 may transmit the COT indication 225-*b*, the signal 230-*b*, or both to the first wireless device 205 over a direct communication link. That is, the COT indications 225 and the signals 230 may not be directly transmitted to (e.g., intended for) the relay device 210. Rather, the relay device 210 may indirectly detect the COT indications 225 and the signals 230, and may determine whether to amplify and forward signals between the first wireless device 205 and the second wireless device 215 based on indirectly detecting the COT indications 225 and the signals 230.

If, for example, the first wireless device 205 is a base station that initiates a COT, the first wireless device 205 may communicate with multiple UEs within the COT. Some of the UEs may be directly connected to the first wireless device 205, while other UEs may be indirectly connected to the first wireless device 205 via the relay device 210. In some examples, the relay device 210 may determine whether to initiate amplify and forward operations without acquiring full scheduling information from the first wireless device 205. Rather, the relay device 210 may selectively perform amplify and forward operations during time periods when the first wireless device 205 is communicating with indirectly connected UEs, and may enter a low-power state (e.g., by deactivating one or more RF chains) at other times to reduce extraneous transmissions.

The relay device 210 may be capable of receiving over-the-air signals or messages and determining whether the first wireless device 205 or the second wireless device 215 is within a COT based on these signals or messages. If the relay device 210 determines that the first wireless device 205 or the second wireless device 215 is within a COT, the relay device 210 may perform an LBT procedure, and may perform amplify and forward operations between the first wireless device 205 and the second wireless device 215 if the LBT procedure is successful (e.g., if the relay device 210 passes the LBT procedure). In some examples, the relay device 210 may determine a time duration for which to perform the amplify and forward operations (e.g., after passing the LBT procedure) based on a maximum COT duration or a remaining COT duration, if such information is available via detection.

The relay device 210 may be capable of receiving a signaling message that indicates a remaining COT duration for the first wireless device 205 or the second wireless device 215. Accordingly, the relay device 210 may amplify and forward signals 230 between the first wireless device 205 and the second wireless device 215 based on the remaining COT (e.g., after passing the LBT procedure). In some examples, the signaling message may have a specific DCI format (e.g., DCI2_0) that indicates a remaining COT for the first wireless device 205 (e.g., a base station). In other examples, the signaling message may be or may include UCI that indicates a remaining COT for the second wireless device 215 (e.g., a UE). If the signaling message includes DCI, the signaling message may indicate COT information as well as SFI information (e.g., TDD downlink, uplink, or flexible patterns across slots in a COT). Accordingly, the relay device 210 may perform amplify and forward operations based on information from the signaling message. For example, the relay device 210 may amplify and forward the signal 230-a in a first relay direction from the first wireless device 205 to the second wireless device 215 during a downlink slot. Additionally or alternatively, the relay device 210 may amplify and forward the signal 230-b in a second relay direction from the second wireless device 215 to the first wireless device 205 during an uplink slot. During flexible slots, the relay device 210 may perform amplify and forward operations in both directions.

If the first wireless device 205 or the second wireless device 215 transmits a signaling message that includes a COT indication, there may be a processing delay associated with the relay device 210 decoding the signaling message (e.g., DCI2_0 or UCI). As such, there may be a gap (e.g., one or more symbols) between when the signaling message is transmitted and when the relay device 210 begins performing amplify and forward operations. Thus, the relay device 210 may perform amplify and forward operations in a window (e.g., time period) that is equal to a difference between the remaining COT and the processing delay (e.g., a remaining COT indicated by DCI2_0 or UCI minus the processing delay associated with decoding the DCI2_0 or UCI). If, for example, the first wireless device 205 is a base station, the relay device 210 may perform amplify and forward operations (e.g., after passing an LBT procedure) within the window regardless of whether the first wireless device 205 is scheduled to communicate with indirectly connected UEs (e.g., UEs that are connected to the first wireless device 205 via the relay device 210 or other repeaters) or directly connected UEs (e.g., UEs that are directly connected to the first wireless device 205).

In some examples, to reduce the likelihood of the relay device 210 amplifying noise or interference, the signaling message (e.g., DCI2_0) can indicate whether the signaling message pertains to the relay device 210. For example, the signaling message may indicate a specific radio network temporary identifier (RNTI) assigned to the relay device 210 (e.g., an SFI RNTI). Alternatively, the signaling message may include a DCI2_0 field that indicates applicable relay devices. In both examples, the first wireless device 205 (e.g., a base station) may selectively schedule communications with indirectly connected UEs associated with the relay device 210 (e.g., the second wireless device 215) within the remaining COT indicated by the signaling message (e.g., DCI2_0) that pertains to the relay device 210. If, for example, the signaling message includes UCI that indicates a remaining COT for the second wireless device 215 (e.g., a UE), the signaling message may be independent from physical uplink shared channel (PUSCH) allocations for the second wireless device 215.

The relay device 210 may also be capable of detecting a specific signal that indicates whether the first wireless device 205 or the second wireless device 215 is within a COT. Upon detecting the specific signal, the relay device 210 may perform amplify and forward operations (e.g., after passing the LBT procedure) based on a maximum COT duration. In some examples, the specific signal (e.g., a preamble sequence that precedes data transmission) may be predefined or preconfigured. Some configuration parameters related to the specific signal may be indicated via control signaling 220, which may be broadcasted by the first wireless device 205. The specific signal may indicate a start of a COT at the first wireless device 205 or the second wireless device 215. The first wireless device 205 or the second wireless device 215 may transmit the specific signal at the beginning of a COT if the COT involves communications with the relay device 210. In some examples, multiple preamble sequences can be defined to indicate a COT, where each preamble sequence indicates a specific remaining COT value. In such examples, the relay device 210 can determine the remaining COT time for amplify and forward operations based on detecting the preamble sequence. In some examples, the specific signal may enable the relay device 210 to acquire a relatively large amount of COT-related information. In other examples, the specific signal may enable the relay device 210 to detect a COT with relatively low latency.

Additionally or alternatively, the relay device 210 may be capable of detecting a specific on-off energy pattern that indicates whether the first wireless device 205 or the second wireless device 215 is within a COT. Upon detecting the specific on-off energy pattern, the relay device 210 may perform amplify and forward operations (e.g., after passing an LBT procedure) based on a maximum COT duration. In some examples, the specific on-off energy pattern may be predefined or preconfigured. The on-off energy pattern can be defined with respect to the time domain or the frequency domain. For example, the on-off energy pattern may be or may include a specific time domain pattern (e.g., on for x1 µs, off for x2 µs, on for x3 µs, off for x4 µs) or a specific frequency domain pattern (e.g., on over a first set of frequency tones, off over a second set of frequency tones, on over a third set of frequency tones). A detected energy level may be considered "on" over a time or frequency window if, for example, the detected energy level is greater than a first threshold. Likewise, a detected energy level may be considered "off" over a time or frequency window if, for example, the detected energy level is less than a second threshold, where the first threshold is higher than the second threshold.

To successfully transmit COT indications 225 via an on-off energy pattern, an "off" duration of the on-off energy pattern may be smaller than a threshold value for maintaining a COT (e.g., less than 25 µs for FR1). In some examples, configuration parameters (e.g., the first threshold, the second threshold) for the specific on-off energy pattern may be included in the control signaling 220 (e.g., a broadcast message) from the first wireless device 205. The specific on-off energy pattern may indicate a start of a COT at the first wireless device 205 or the second wireless device 215. In some examples, the first wireless device 205 or the second wireless device 215 may transmit a filler signal (e.g., an extended CP) along with the on-off energy pattern at the start of a COT. Using an on-off energy pattern to signal a COT indication may be associated with lower signaling overhead and lower decoding latency, among other benefits.

The first wireless device 205 or the second wireless device 215 may configure a time gap for the relay device 210 to perform an LBT procedure after the relay device 210 detects the COT indications 225. During this time gap, the first wireless device 205 or the second wireless device 215 may maintain the COT such that other wireless devices do not occupy the channel while the relay device 210 is performing an LBT procedure. In some examples, an LBT procedure type of the relay device 210 may be predefined or indicated in the control signaling 220 (e.g., a broadcast message from the first wireless device 205). As an example, the relay device 210 may be configured to perform a Type 2 LBT procedure with a fixed sensing duration or a Type 1 LBT procedure with a random sensing duration. For Type 1 LBT procedures, the LBT procedure may be regarded as a failure if the LBT procedure does not succeed within a defined threshold time after the relay device 210 initiates the LBT procedure.

After performing an LBT procedure, the relay device 210 may indicate a result of the LBT procedure to the first wireless device 205 and the second wireless device 215. Accordingly, the first wireless device 205 and the second wireless device 215 may determine whether to use the relay device 210 for subsequent communications based on the indicated result. In some examples, the relay device 210 may transmit an indication of an LBT failure to the first wireless device 205 and the second wireless device 215. Upon receiving the indication of the LBT failure, the first wireless device 205 and the second wireless device 215 may determine not to use the relay device 210 for subsequent communications. In other examples, the relay device 210 may transmit an indication of a successful LBT procedure to the first wireless device 205 and the second wireless device 215. In such examples, the first wireless device 205 and the second wireless device 215 may refrain from communicating via the relay device 210 until the indication is received.

The first wireless device 205 and the second wireless device 215 may initiate communications via the relay device 210 after a fixed time offset, which may be defined with respect to the COT indications 225 (e.g., a time at which the COT indications 225 were transmitted). The fixed time offset may account for potential LBT failures at the relay device 210. More specifically, the fixed time offset may account for detection latency at the relay device 210 and any LBT procedures performed by the relay device 210. In addition to communicating with the second wireless device 215 via the relay device 210, the first wireless device 205 may also communicate with the second wireless device 215 via a direct communication link, as shown in FIG. 2. In some examples, the first wireless device 205 and the second wireless device 215 may be examples of a base station and a UE in an access network. In other examples, the first wireless device 205 and the second wireless device 215 may be examples of sidelink UEs. Similarly, the relay device 210 may be an example of an autonomous smart repeater, a network-controlled smart repeater, an intelligent reflecting surface (IRS), or a reconfigurable intelligent surface (RIS), among other examples.

The wireless communications system 200 may support techniques for reduced power consumption at the relay device 210 and improved communication reliability between the first wireless device 205 and the second wireless device 215. For example, the relay device 210 may perform an LBT procedure prior to relaying (e.g., amplifying and forwarding) signals between the first wireless device 205 and the second wireless device 215 over a channel in an unlicensed RF spectrum band, which may reduce the likelihood of the relay device 210 amplifying and forwarding noise (e.g., interference, signals from other wireless devices) on the channel. Reducing the amount of noise amplified by the relay device 210 may improve the reliability of communications between the first wireless device 205 and the second wireless device 215. In addition, the described techniques may enable the relay device 210 to determine when one or both of the first wireless device 205 and the second wireless device 215 have initiated a COT. As such, the relay device 210 may relay signals between the first wireless device 205 and the second wireless device 215 during the COT, and may enter a low-power mode outside of (e.g., before, after) the COT, which may result in greater power savings at the relay device 210.

FIGS. 3A, 3B, and 3C illustrate examples of an LBT procedure 300, an LBT procedure 301, and an LBT procedure 302, respectively, that support techniques for smart repeater operations in unlicensed bands in accordance with aspects of the present disclosure. The LBT procedure 300, the LBT procedure 301, and the LBT procedure 302 may implement or be implemented by aspects of the wireless communications system 100 or the wireless communications system 200. For example, the LBT procedure 300, the LBT procedure 301, or the LBT procedure 302 may be implemented by a UE, a base station, or a relay device, which may be examples of corresponding devices described with reference to FIGS. 1 and 2. A wireless device (e.g., a UE, a base station, a relay device) may perform the LBT procedure 300, the LBT procedure 301, or the LBT procedure 302 before transmitting signals over a channel in an unlicensed RF spectrum band to reduce the likelihood of signal collisions on the channel.

The LBT procedure 300 may be an example of a Type 1 LBT procedure, as described with reference to FIGS. 1 and 2. The LBT procedure 300 may involve performing a random backoff with a contention window of a variable size. A wireless device may perform the LBT procedure 300 while operating in NR-U frequency bands below 6 GHz. The LBT procedure 300 may be an example of a load-based LBT procedure initiated by the wireless device. At 305, the wireless device may determine that the channel is busy (e.g., based on a detected energy level of the channel). After the wireless device detects that the channel is busy, the wireless device may enter a defer period 320, in which the wireless device performs channel sensing to determine if the channel is occupied. The wireless device may refrain from transmitting signals on the channel during the defer period 320. A length of the defer period 320 may be based on an LBT access priority value (e.g., $m_p$) of the wireless device. In the example of FIG. 3A, the LBT access priority value of the wireless device may be 3. However, it is to be understood that the wireless device may be configured with any number of different LBT access priority values. The defer period 320 may include a sensing slot 310-a, a sensing slot 310-b, a sensing slot 310-c, and a sensing slot 310-d. In the example of FIG. 3A, the sensing slot 310-a may have a duration of 16 μs, and the sensing slot 310-b may have a duration of 9 μs.

After the sensing slot 310-d, the wireless device may decrement a counter for each subsequent idle sensing slot in a time period 325 (e.g., a random backoff period, a variable-size contention window). In some examples, the time period 325 may have an exponentially updated contention window size that is based on acknowledgement (ACK) or negative acknowledgement (NACK) feedback. If, for example, the wireless device detects that an energy level of the channel is below a threshold during a sensing slot 310-e (e.g., if the sensing slot 310-e is idle), the wireless device may decrement the counter from a random starting value (e.g., N), and may continue decrementing the counter for each subsequent idle sensing slot. If, for example, the counter reaches a threshold value (e.g., 0) during or after a sensing slot 310-f, the wireless device may begin a data transmission 315 on the channel. In some examples, the data transmission 315 may be based on a maximum COT duration 330 for a priority class of the wireless device. In the example of FIG. 3A, the maximum COT duration 330 may be less than 10 ms. However, it is to be understood that other maximum COT durations may also be used.

The LBT procedure 301 may be an example of a Type 2A LBT procedure with a 25 μs sensing duration, as described with reference to FIGS. 1 and 2. A wireless device may perform the LBT procedure 301 while operating in NR-U frequency bands below 6 GHz. The LBT procedure 301 may be an example of a load-based LBT procedure used for COT sharing. That is, the LBT procedure 301 may be performed by the wireless device (e.g., a responding wireless device) during a COT sharing process. The LBT procedure 301 may include a sensing slot 345-a and a sensing slot 345-b, each of which may have a duration of 9 µs. The LBT procedure 301 may also include a sensing period 350-a (e.g., within the sensing slot 345-a) and a sensing period 350-b (e.g., within the sensing slot 345-b), each of which may have a duration of 4 µs. In some examples, the wireless device may perform the LBT procedure 301 on a channel in an unlicensed RF spectrum band before transmitting signals on the channel. If the wireless device detects that an energy level of the channel is above a threshold during the LBT procedure 301 (e.g., if the channel is occupied), the wireless device may refrain from transmitting signals on the channel. Alternatively, if the wireless device detects that an energy level of the channel is below a threshold during the LBT procedure 301 (e.g., if the channel is unoccupied), the wireless device may transmit signals on the channel.

The LBT procedure 302 may be an example of a Type 2B LBT procedure with a 16 µs sensing duration, as described with reference to FIGS. 1 and 2. A wireless device may perform the LBT procedure 302 while operating in NR-U frequency bands below 6 GHz. The LBT procedure 301 may be an example of a load-based LBT procedure used for COT sharing. That is, the LBT procedure 301 may be performed by the wireless device (e.g., a responding wireless device) during a COT sharing process. The LBT procedure 302 may include a sensing slot 345-c, a sensing period 350-c, and a time overlap 355. The sensing slot 345-c may have a duration of 9 µs, the sensing period 350-c may have a duration of 5 µs, and the time overlap 355 may have a duration of less than 4 µs. In some examples, the wireless device may perform the LBT procedure 302 on a channel in an unlicensed RF spectrum band before transmitting signals on the channel. If the wireless device detects that an energy level of the channel is above a threshold during the LBT procedure 302 (e.g., if the channel is occupied), the wireless device may refrain from transmitting signals on the channel. Alternatively, if the wireless device detects that an energy level of the channel is below a threshold during the LBT procedure 302 (e.g., if the channel is unoccupied), the wireless device may transmit signals on the channel.

In accordance with the described techniques, a relay device (e.g., a smart repeater) may determine that a first wireless device (e.g., a UE or a base station) or a second wireless device (e.g., a UE or a base station) has occupied a channel in an unlicensed RF spectrum band based on receiving a COT indication from the first wireless device or the second wireless device. Accordingly, the relay device may perform an LBT procedure, which may be an example of the LBT procedure 300 (e.g., a Type 1 LBT procedure), the LBT procedure 301 (e.g., a Type 2A LBT procedure), or the LBT procedure 302 (e.g., a Type 2B LBT procedure). If the relay device passes the LBT procedure, the relay device may amplify and forward signals between the first wireless device and the second wireless device. Alternatively, if the LBT procedure is unsuccessful, the relay device may refrain from amplifying and forwarding signals between the first wireless device and the second wireless device.

Configuring the relay device to perform the LBT procedure 300, the LBT procedure 301, or the LBT procedure 302 based on receiving a COT indication from the first wireless device or the second wireless device may reduce power consumption at the relay device, and may also improve the reliability of communications between the first wireless device and the second wireless device. Specifically, performing the LBT procedure 300, the LBT procedure 301, or the LBT procedure 302 prior to relaying (e.g., amplifying and forwarding) signals between the first wireless device and the second wireless device may reduce the likelihood of the relay device amplifying and forwarding noise (e.g., interference, signals from other wireless devices). Reducing the amount of noise amplified by the relay device may increase the likelihood of successful communications between the first wireless device and the second wireless device. In addition, configuring the relay device to detect COT indications from the first wireless device or the second wireless device may improve the power efficiency of the relay device. For example, the relay device may receive a COT indication from the first wireless device, and may determine that the first wireless device has initiated a COT based on receiving the COT indication. Accordingly, the relay device may amplify and forward signals between the first wireless device and the second wireless device during the COT, and may enter a low-power mode outside of (e.g., before, after) the COT, which may result in greater power savings at the relay device.

Figure 4:
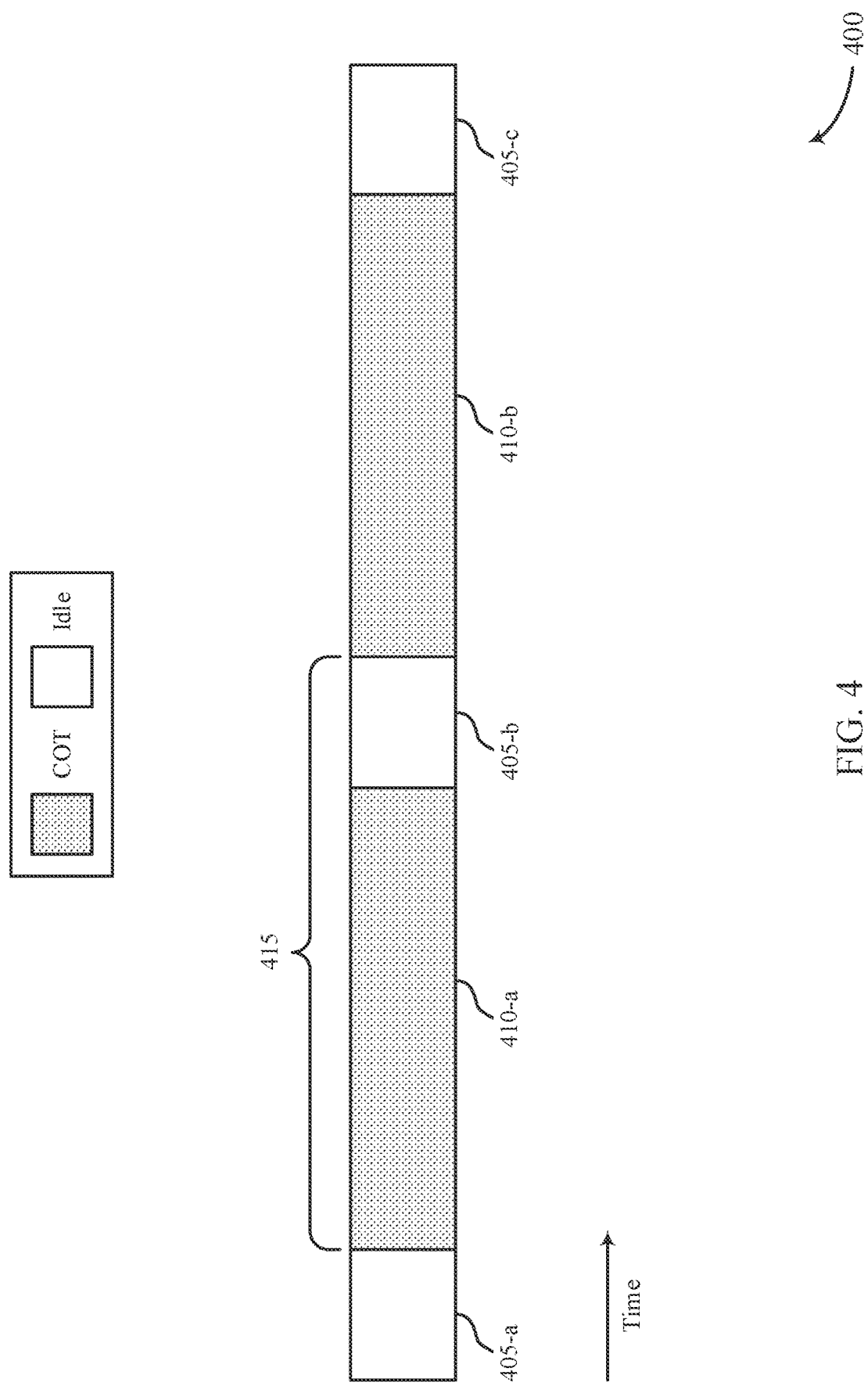
FIGS. 4 and 5 illustrate examples of LBT procedures that support techniques for smart repeater operations in unlicensed bands in accordance with aspects of the present disclosure.

FIG. 4 illustrates an example of an LBT procedure 400 that supports techniques for smart repeater operations in unlicensed bands in accordance with aspects of the present disclosure. The LBT procedure 400 may implement or be implemented by aspects of the wireless communications system 100 or the wireless communications system 200. For example, the LBT procedure 400 may be implemented by a UE, a base station, or a relay device, which may be examples of corresponding devices described with reference to FIGS. 1 and 2. A wireless device (e.g., a UE, a base station, or a relay device) may perform the LBT procedure 400 before transmitting signals over a channel in an unlicensed RF spectrum band to reduce the likelihood of signal collisions on the channel.

The LBT procedure 400 may be an example of a frame-based LBT procedure used in NR-U frequency bands below 6 GHz. In some examples, a wireless device may initiate the LBT procedure 400 with a fixed frame structure, and may subsequently perform COT sharing with a second wireless device based on a result of the LBT procedure 400. The LBT procedure 400 may include an idle period 405-a, an idle period 405-b, an idle period 405-c, a COT 410-a, a COT 410-b, and a fixed frame period 415. The wireless device may perform channel sensing in the idle periods 405 using a sensing slot duration of 9 µs. In some examples, the fixed frame period 415 (e.g., periodicity) may have a predefined length (e.g., 1 ms, 2 ms, 2.5 ms, 4.5 ms, or 10 ms). If the wireless device determines that the channel is available based on performing channel sensing in the idle periods 405, the wireless device may occupy (e.g., reserve) the channel. For example, if the wireless device determines that the channel is unoccupied based on performing channel sensing in the idle period 405-a, the wireless device may occupy the channel for the COT 410-a. Likewise, if the wireless device determines that the channel is unoccupied based on performing channel sensing in the idle period 405-b, the wireless device may occupy the channel for the COT 410-b.

In accordance with the described techniques, a relay device (e.g., a smart repeater) may determine that a first wireless device (e.g., a UE or a base station) or a second wireless device (e.g., a UE or a base station) has occupied a channel in an unlicensed RF spectrum band based on receiving a COT indication from the first wireless device or the second wireless device. Accordingly, the relay device may perform an LBT procedure, which may be an example of the LBT procedure 400. If the relay device passes the LBT procedure, the relay device may amplify and forward signals between the first wireless device and the second wireless device. Alternatively, if the LBT procedure is unsuccessful, the relay device may refrain from amplifying and forwarding signals between the first wireless device and the second wireless device.

Configuring the relay device to perform the LBT procedure 400 based on receiving a COT indication from the first wireless device or the second wireless device may reduce power consumption at the relay device, and may also improve the reliability of communications between the first wireless device and the second wireless device. Specifically, performing the LBT procedure 400 prior to relaying (e.g., amplifying and forwarding) signals between the first wireless device and the second wireless device may reduce the likelihood of the relay device amplifying and forwarding noise (e.g., interference, signals from other wireless devices). Reducing the amount of noise amplified by the relay device may increase the likelihood of successful communications between the first wireless device and the second wireless device. In addition, configuring the relay device to detect COT indications from the first wireless device or the second wireless device may improve the power efficiency of the relay device. For example, the relay device may receive a COT indication from the first wireless device, and may determine that the first wireless device has initiated a COT based on receiving the COT indication. Accordingly, the relay device may amplify and forward signals between the first wireless device and the second wireless device during the COT, and may enter a low-power mode outside of (e.g., before, after) the COT, which may result in greater power savings at the relay device.

Figure 5:
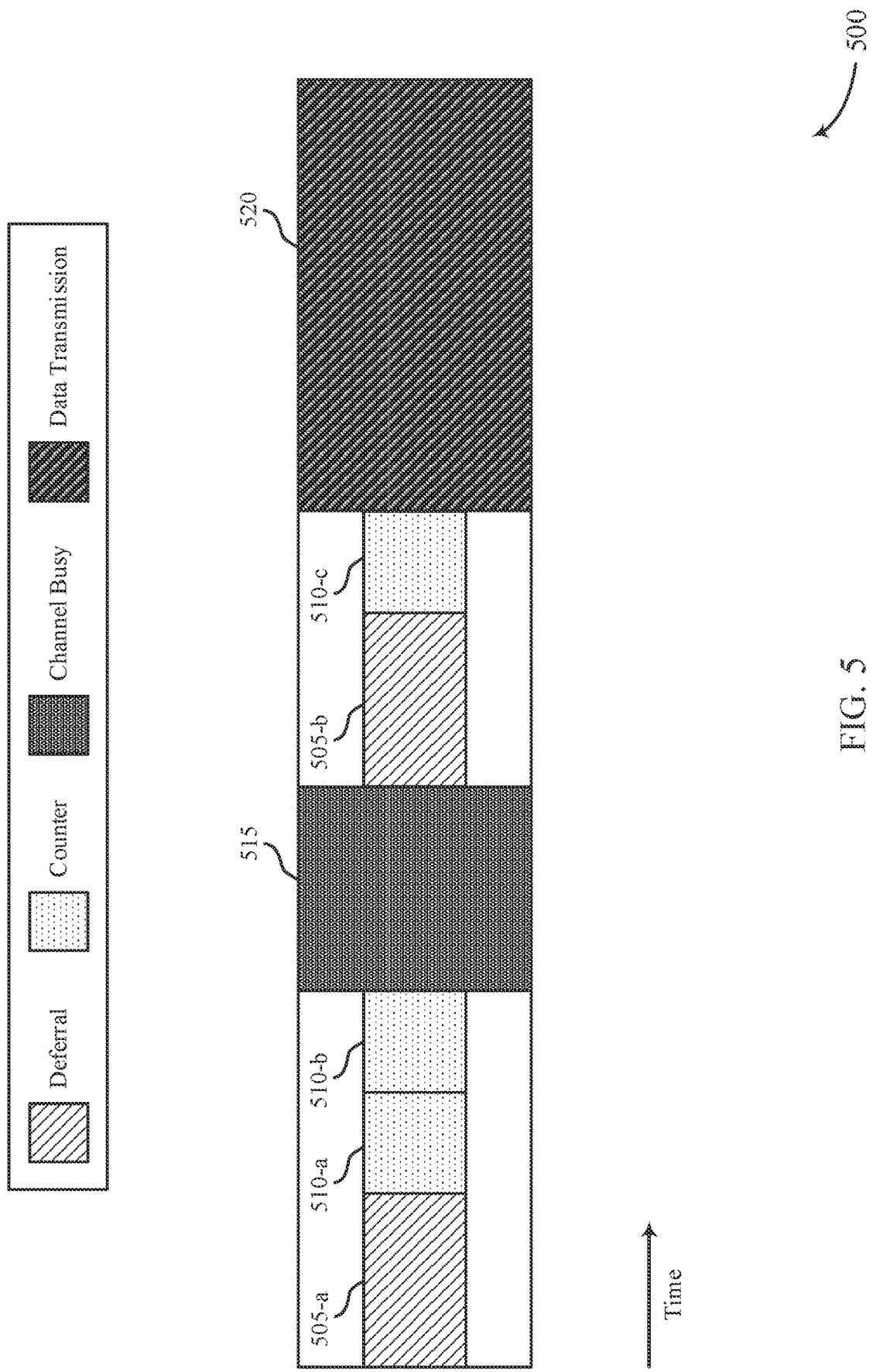

FIG. 5 illustrates an example of an LBT procedure 500 that supports techniques for smart repeater operations in unlicensed bands in accordance with aspects of the present disclosure. The LBT procedure 500 may implement or be implemented by aspects of the wireless communications system 100 or the wireless communications system 200. For example, the LBT procedure 500 may be implemented by a UE, a base station, or a relay device, which may be examples of corresponding devices described with reference to FIGS. 1 and 2. A wireless device (e.g., a UE, a base station, or a relay device) may perform the LBT procedure 500 before transmitting signals over a channel in an unlicensed RF spectrum band to reduce the likelihood of signal collisions on the channel.

A wireless device may perform the LBT procedure 500 while operating in NR-U bands above 60 GHz. In accordance with the LBT procedure 500, a wireless device may perform random backoff with a fixed contention window size. The LBT procedure 500 may include deferral periods 505 and counter periods 510. The deferral periods 505 may have a duration of 8 μs, and the counter periods 510 may correspond to an initial random value (e.g., 0-3). The LBT procedure 500 may be associated with a maximum COT duration of less than 5 ms and a sensing slot duration of 5 μs. In the example of FIG. 5, the wireless device may enter a deferral period 505-a prior to transmitting signals on a channel in an unlicensed RF spectrum band. If the wireless device determines that the channel is unoccupied during the deferral period 505-a, the wireless device may enter a random backoff period. During the random backoff period, which may include a counter period 510-a and a counter period 510-b, the wireless device may refrain from transmitting on the channel. After the counter period 510-b, the wireless device may perform channel sensing to determine if the channel is occupied. In the example of FIG. 5, the wireless device may determine that the channel is busy at 515. Accordingly, the wireless device may enter a deferral period 505-b. If the wireless device determines that the channel is unoccupied based on performing channel sensing in the deferral period 505-b, the wireless device may proceed to a counter period 510-c. If the channel is still unoccupied after the counter period 510-c, the wireless device may initiate a data transmission 520 on the channel.

In accordance with the described techniques, a relay device (e.g., a smart repeater) may determine that a first wireless device (e.g., a UE or a base station) or a second wireless device (e.g., a UE or a base station) has occupied a channel in an unlicensed RF spectrum band based on receiving a COT indication from the first wireless device or the second wireless device. Accordingly, the relay device may perform an LBT procedure, which may be an example of the LBT procedure 500. If the relay device passes the LBT procedure, the relay device may amplify and forward signals between the first wireless device and the second wireless device. Alternatively, if the LBT procedure is unsuccessful, the relay device may refrain from amplifying and forwarding signals between the first wireless device and the second wireless device.

Configuring the relay device to perform the LBT procedure 500 based on receiving a COT indication from the first wireless device or the second wireless device may reduce power consumption at the relay device, and may also improve the reliability of communications between the first wireless device and the second wireless device. Specifically, performing the LBT procedure 500 prior to relaying (e.g., amplifying and forwarding) signals between the first wireless device and the second wireless device may reduce the likelihood of the relay device amplifying and forwarding noise (e.g., interference, signals from other wireless devices) between the first wireless device and the second wireless device. Reducing the amount of noise amplified by the relay device may increase the likelihood of successful communications between the first wireless device and the second wireless device. In addition, configuring the relay device to detect COT indications from the first wireless device or the second wireless device may improve the power efficiency of the relay device. For example, the relay device may receive a COT indication from the first wireless device, and may determine that the first wireless device has initiated a COT based on receiving the COT indication. Accordingly, the relay device may amplify and forward signals between the first wireless device and the second wireless device during the COT, and may enter a low-power mode outside of (e.g., before, after) the COT, which may result in greater power savings at the relay device.

Figure 6:
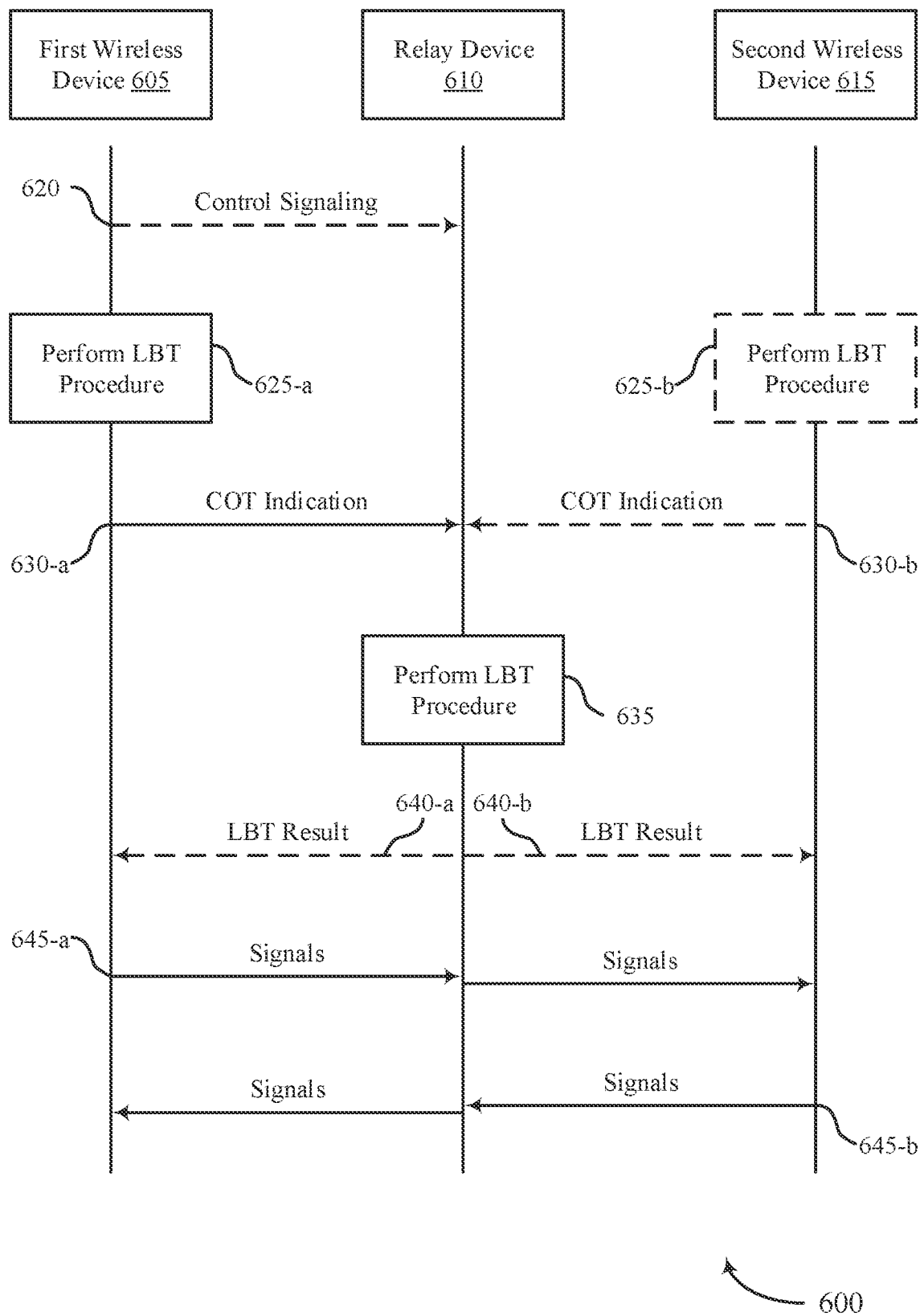
FIG. 6 illustrates an example of a process flow that supports techniques for smart repeater operations in unlicensed bands in accordance with aspects of the present disclosure.

FIG. 6 illustrates an example of a process flow 600 that supports techniques for smart repeater operations in unlicensed bands in accordance with aspects of the present disclosure. The process flow 600 may implement or be implemented by aspects of the wireless communications system 100 or the wireless communications system 200. For example, the process flow 600 may include a first wireless device 605, a relay device 610, and a second wireless device 615, which may be examples of corresponding devices described with reference to FIG. 2. In the following description of the process flow 600, operations between the first wireless device 605, the relay device 610, and the second wireless device 615 may be performed in a different order or at a different time than as shown. Additionally or alternatively, some operations may be omitted from the process flow 600, and other operations may be added to the process flow 600.

At 620, the first wireless device 605 (e.g., a base station or a UE) may transmit control signaling to the relay device 610. The control signaling may indicate a COT for the first wireless device 605 or the second wireless device 615, a RNTI of the relay device 610, a DCI field value associated with the relay device 610, a UCI field value associated with the relay device 610, relay direction information, TDD information, a set of preamble configuration parameters, a set of preconfigured preamble sequences, a set of energy thresholds, a set of preconfigured energy patterns, an LBT type for the relay device 610, or a combination thereof.

At 625, one or both of the first wireless device 605 and the second wireless device 615 (e.g., a base station or a UE) may perform an LBT procedure to determine if a channel in an unlicensed RF spectrum band is occupied (e.g., to determine if other wireless devices are using the channel). For example, the first wireless device 605 may perform a first LBT procedure at 625-a. If the first wireless device 605 passes the first LBT procedure (e.g., if the first LBT procedure is successful), the first wireless device 605 may occupy the channel for a COT. Alternatively, if the first wireless device 605 does not pass the first LBT procedure (e.g., if the first LBT procedure is unsuccessful), the first wireless device 605 may perform additional LBT procedures until the first wireless device 605 determines that the channel is clear (e.g., unoccupied. Additionally or alternatively, the second wireless device 615 may perform a second LBT procedure at 625-b. If the second wireless device 615 passes the second LBT procedure, the second wireless device 615 may occupy the channel for a COT. Alternatively, if the second wireless device 615 does not pass the second LBT procedure, the second wireless device may perform additional LBT procedures until the second wireless device 615 determines that the channel is clear.

At 630, the relay device 610 may receive COT indications from one or both of the first wireless device 605 and the second wireless device 615. The COT indications may be based on a result of the first LBT procedure (e.g., the LBT procedure performed by the first wireless device 605), a result of the second LBT procedure (e.g., the LBT procedure performed by the second wireless device 615), or both. For example, the relay device 610 may receive a COT indication from the first wireless device 605 at 630-a if the first LBT procedure is successful. Additionally or alternatively, the relay device 610 may receive a COT indication from the second wireless device 615 at 630-b if the second LBT procedure is successful. In some examples, the COT indications may be or may include preamble sequences, energy patterns, DCI, UCI, or a combination thereof. In such examples, the relay device 610 may detect the COT indications based on the control signaling. For example, the relay device 610 may detect an energy pattern using a set of energy thresholds specified in the control signaling, and may determine that the first wireless device 605 or the second wireless device 615 has initiated a COT based on detecting the energy pattern.

At 635, the relay device 610 may perform a third LBT procedure (e.g., on the channel) based on receiving COT indications from one or both of the first wireless device 605 and the second wireless device 615. In some examples, the third LBT procedure may be an example of a Type 1 LBT procedure or a Type 2 LBT procedure, as described with reference to FIGS. 3A, 3B, and 3C. If the relay device 610 passes the third LBT procedure, the relay device 610 may relay (e.g., amplify and forward) signals between the first wireless device 605 and the second wireless device 615. Alternatively, if the relay device 610 does not pass the third LBT procedure (e.g., if the relay device 610 determines that the channel is occupied), the relay device 610 may refrain from relaying signals between the first wireless device 605 and the second wireless device 615. In some examples, the relay device 610 may indicate a result of the third LBT procedure to the first wireless device 605 or the second wireless device 615 at 640. For example, the relay device 610 may indicate a result of the third LBT procedure to the first wireless device 605 at 640-a. Additionally or alternatively, the relay device 610 may indicate a result of the third LBT procedure to the second wireless device 615 at 640-b. Accordingly, the first wireless device 605 and the second wireless device 615 may determine whether to utilize the relay device 610 based on the result of third LBT procedure.

At 645, the relay device 610 may relay (e.g., amplify and forward) signals between the first wireless device 605 and the second wireless device 615 based on the COT indications and a result of the third LBT procedure. At 645-a, the relay device 610 may relay signals in a first relay direction from the first wireless device 605 to the second wireless device 615. At 645-b, the relay device 610 may relay signals in a second relay direction from the second wireless device 615 to the first wireless device 605. In some examples, the relay device 610 may relay signals between the first wireless device 605 and the second wireless device 615 during a first portion of a COT (e.g., a COT of the first wireless device 605 or the second wireless device 615), and may deactivate one or more RF chains during a second portion of the COT (e.g., to conserve power).

The process flow 600 may support techniques for reduced power consumption at the relay device 610 and improved communication reliability between the first wireless device 605 and the second wireless device 615. For example, the described techniques may enable the relay device 610 to perform an LBT procedure prior to relaying (e.g., amplifying and forwarding) signals between the first wireless device 605 and the second wireless device 615, which may reduce the likelihood of the relay device 610 amplifying and forwarding noise (e.g., interference, signals from other wireless devices) between the first wireless device 605 and the second wireless device 615. Reducing the amount of noise amplified by the relay device 610 may improve the reliability of communications between the first wireless device 605 and the second wireless device 615. In addition, the described techniques may enable the relay device 610 to determine when the first wireless device 605 or the second wireless device 615 has initiated a COT. As such, the relay device 610 may relay signals between the first wireless device 605 and the second wireless device 615 during the COT, and may enter a low-power mode outside of (e.g., before, after) the COT, which may result in greater power savings at the relay device 610.

Figure 7:
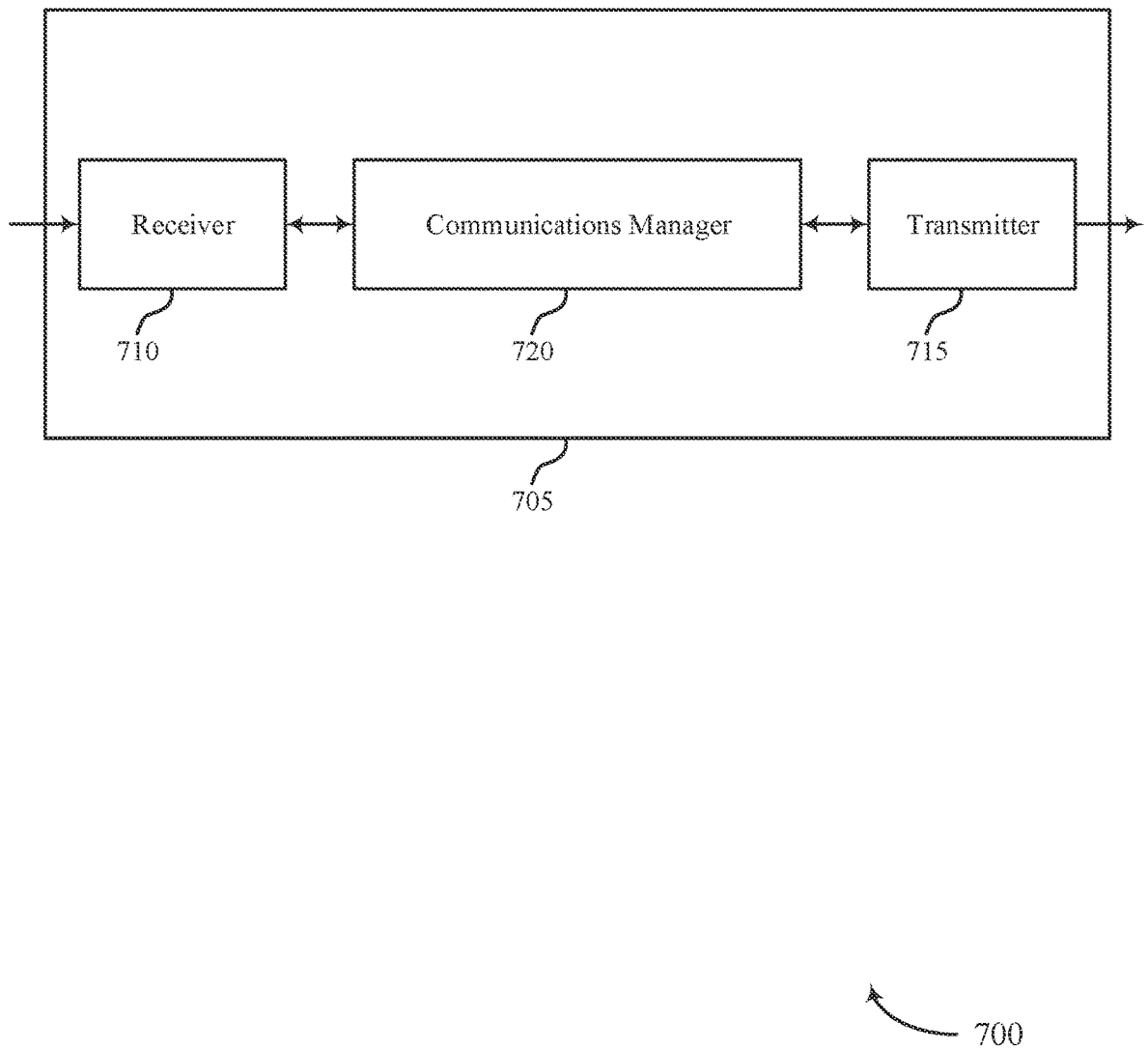
FIGS. 7 and 8 show block diagrams of devices that support techniques for smart repeater operations in unlicensed bands in accordance with aspects of the present disclosure.

FIG. 7 shows a block diagram 700 of a device 705 that supports techniques for smart repeater operations in unlicensed bands in accordance with aspects of the present disclosure. The device 705 may be an example of aspects of a relay device as described herein. The device 705 may include a receiver 710, a transmitter 715, and a communications manager 720. The device 705 may also include a processor. Each of these components may be in communication with one another (e.g., via one or more buses).

The receiver 710 may provide a means for receiving information such as packets, user data, control information, or any combination thereof associated with various information channels (e.g., control channels, data channels, information channels related to techniques for smart repeater operations in unlicensed bands). Information may be passed on to other components of the device 705. The receiver 710 may utilize a single antenna or a set of multiple antennas.

The transmitter 715 may provide a means for transmitting signals generated by other components of the device 705. For example, the transmitter 715 may transmit information such as packets, user data, control information, or any combination thereof associated with various information channels (e.g., control channels, data channels, information channels related to techniques for smart repeater operations in unlicensed bands). In some examples, the transmitter 715 may be co-located with a receiver 710 in a transceiver module. The transmitter 715 may utilize a single antenna or a set of multiple antennas.

The communications manager 720, the receiver 710, the transmitter 715, or various combinations thereof or various components thereof may be examples of means for performing various aspects of techniques for smart repeater operations in unlicensed bands as described herein. For example, the communications manager 720, the receiver 710, the transmitter 715, or various combinations or components thereof may support a method for performing one or more of the functions described herein.

In some examples, the communications manager 720, the receiver 710, the transmitter 715, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 720, the receiver 710, the transmitter 715, or various combinations or components thereof may be implemented in code (e.g., as communications management software or firmware) executed by a processor. If implemented in code executed by a processor, the functions of the communications manager 720, the receiver 710, the transmitter 715, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 720 may be configured to perform various operations (e.g., receiving, monitoring, transmitting) using or otherwise in cooperation with the receiver 710, the transmitter 715, or both. For example, the communications manager 720 may receive information from the receiver 710, send information to the transmitter 715, or be integrated in combination with the receiver 710, the transmitter 715, or both to receive information, transmit information, or perform various other operations as described herein.

The communications manager 720 may support wireless communications at the device 705 (e.g., a relay device) in accordance with examples as disclosed herein. For example, the communications manager 720 may be configured as or otherwise support a means for receiving an indication that a first wireless device or a second wireless device is occupying a channel in an unlicensed RF spectrum band. The communications manager 720 may be configured as or otherwise support a means for performing an LBT procedure on the channel based on receiving the indication. The communications manager 720 may be configured as or otherwise support a means for relaying signals between the first wireless device and the second wireless device over the channel based on the device 705 passing the LBT procedure.

By including or configuring the communications manager 720 in accordance with examples as described herein, the device 705 (e.g., a processor controlling or otherwise coupled to the receiver 710, the transmitter 715, the communications manager 720, or a combination thereof) may support techniques for reduced power consumption at the device 705. For example, the described techniques may enable the device 705 to detect that a first wireless device or a second wireless device has initiated a COT. Accordingly, the relay device may relay signals between the first wireless device and the second wireless device during the COT, and the relay device may deactivate one or more RF chains outside of the COT. Deactivating RF chains outside of the COT may result in greater power savings at the device 705, among other benefits.

Figure 8:
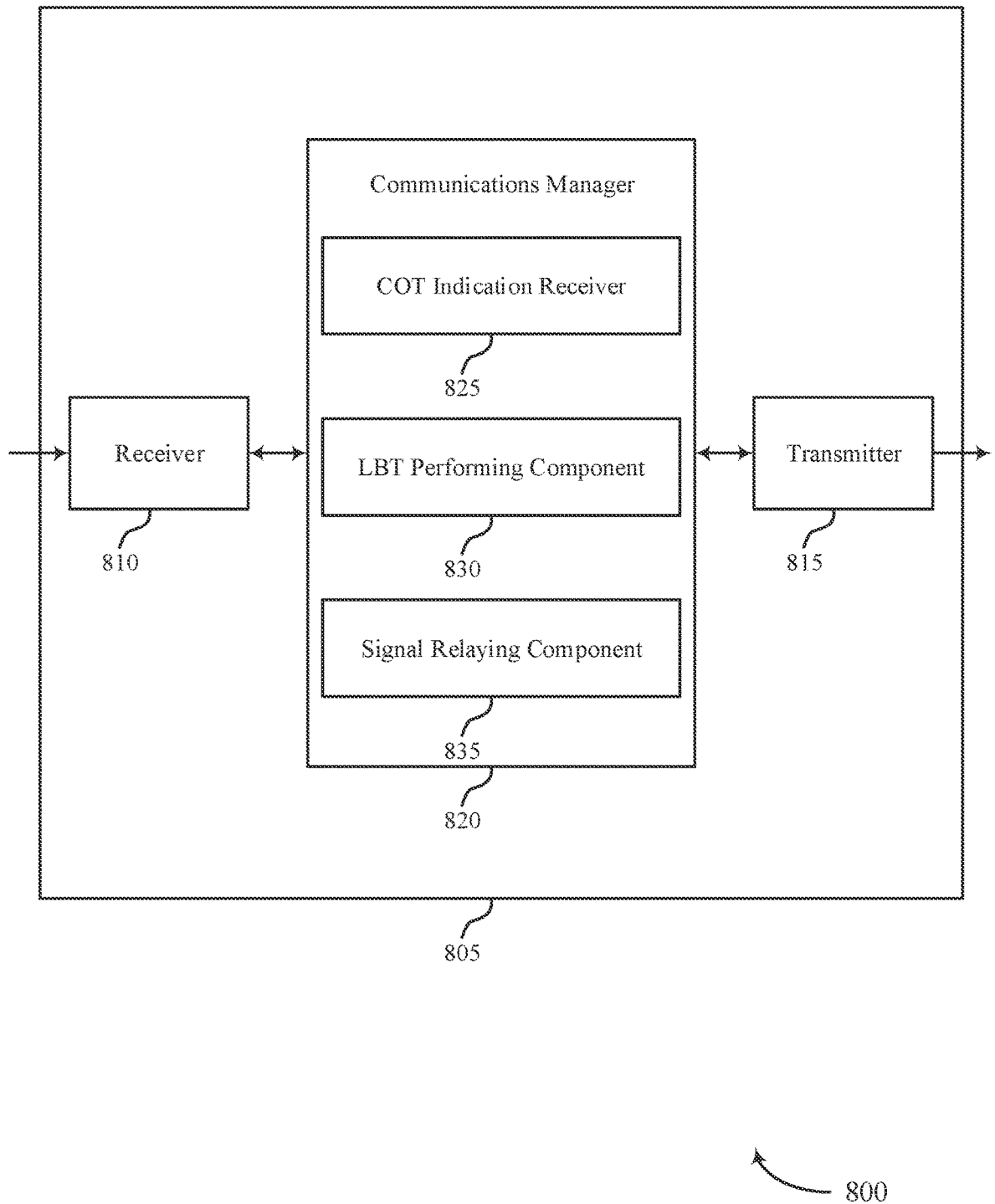

FIG. 8 shows a block diagram 800 of a device 805 that supports techniques for smart repeater operations in unlicensed bands in accordance with aspects of the present disclosure. The device 805 may be an example of aspects of a device 705 or a relay device 115 as described herein. The device 805 may include a receiver 810, a transmitter 815, and a communications manager 820. The device 805 may also include a processor. Each of these components may be in communication with one another (e.g., via one or more buses).

The receiver 810 may provide a means for receiving information such as packets, user data, control information, or any combination thereof associated with various information channels (e.g., control channels, data channels, information channels related to techniques for smart repeater operations in unlicensed bands). Information may be passed on to other components of the device 805. The receiver 810 may utilize a single antenna or a set of multiple antennas.

The transmitter 815 may provide a means for transmitting signals generated by other components of the device 805. For example, the transmitter 815 may transmit information such as packets, user data, control information, or any combination thereof associated with various information channels (e.g., control channels, data channels, information channels related to techniques for smart repeater operations in unlicensed bands). In some examples, the transmitter 815 may be co-located with a receiver 810 in a transceiver module. The transmitter 815 may utilize a single antenna or a set of multiple antennas.

The device 805, or various components thereof, may be an example of means for performing various aspects of techniques for smart repeater operations in unlicensed bands as described herein. For example, the communications manager 820 may include a COT indication receiver 825, an LBT performing component 830, a signal relaying component 835, or any combination thereof. The communications manager 820 may be an example of aspects of a communications manager 720 as described herein. In some examples, the communications manager 820, or various components thereof, may be configured to perform various operations (e.g., receiving, monitoring, transmitting) using or otherwise in cooperation with the receiver 810, the transmitter 815, or both. For example, the communications manager 820 may receive information from the receiver 810, send information to the transmitter 815, or be integrated in combination with the receiver 810, the transmitter 815, or both to receive information, transmit information, or perform various other operations as described herein.

The communications manager 820 may support wireless communications at the device 805 (e.g., a relay device) in accordance with examples as disclosed herein. The COT indication receiver 825 may be configured as or otherwise support a means for receiving an indication that a first wireless device or a second wireless device is occupying a channel in an unlicensed RF spectrum band. The LBT performing component 830 may be configured as or otherwise support a means for performing an LBT procedure on the channel based on receiving the indication. The signal relaying component 835 may be configured as or otherwise support a means for relaying signals between the first wireless device and the second wireless device over the channel based on the device 805 passing the LBT procedure.

Figure 9:
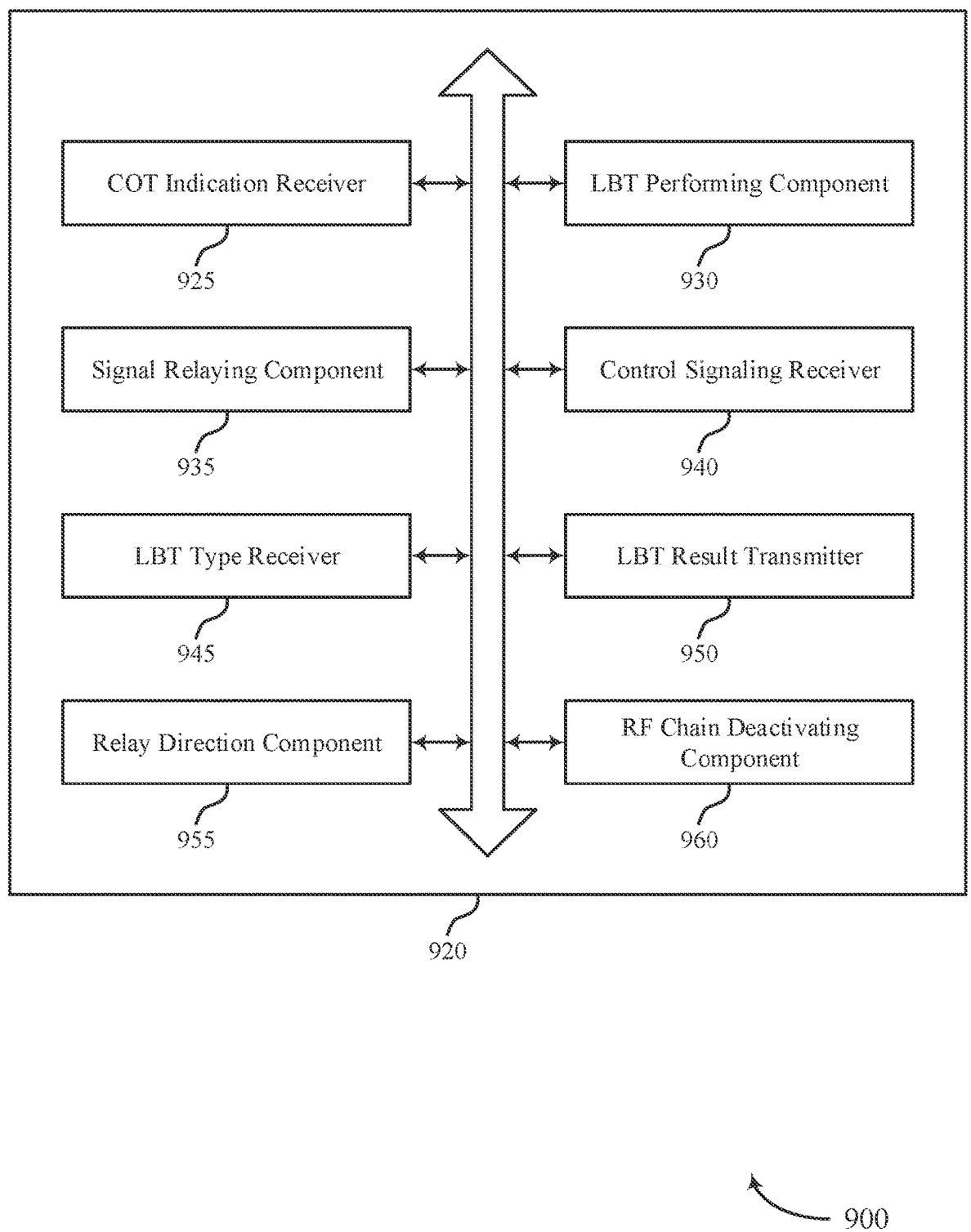
FIG. 9 shows a block diagram of a communications manager that supports techniques for smart repeater operations in unlicensed bands in accordance with aspects of the present disclosure.

FIG. 9 shows a block diagram 900 of a communications manager 920 that supports techniques for smart repeater operations in unlicensed bands in accordance with aspects of the present disclosure. The communications manager 920 may be an example of aspects of a communications manager 720, a communications manager 820, or both, as described herein. The communications manager 920, or various components thereof, may be an example of means for performing various aspects of techniques for smart repeater operations in unlicensed bands as described herein. For example, the communications manager 920 may include a COT indication receiver 925, an LBT performing component 930, a signal relaying component 935, a control signaling receiver 940, an LBT type receiver 945, an LBT result transmitter 950, a relay direction component 955, an RF chain deactivating component 960, or any combination thereof. Each of these components may communicate, directly or indirectly, with one another (e.g., via one or more buses).

The communications manager 920 may support wireless communications at the device 905 (e.g., a relay device) in accordance with examples as disclosed herein. The COT indication receiver 925 may be configured as or otherwise support a means for receiving an indication that a first wireless device or a second wireless device is occupying a channel in an unlicensed RF spectrum band. The LBT performing component 930 may be configured as or otherwise support a means for performing an LBT procedure on the channel based on receiving the indication. The signal relaying component 935 may be configured as or otherwise support a means for relaying signals between the first wireless device and the second wireless device over the channel based on the device 905 passing the LBT procedure.

In some examples, to support receiving the indication, the COT indication receiver 925 may be configured as or otherwise support a means for receiving an indication of a COT for the first wireless device or the second wireless device, where relaying signals between the first wireless device and the second wireless device is based on the COT. In some examples, the first wireless device includes a base station and the second wireless device includes a UE. In other examples, the first wireless device includes a first UE and the second wireless device includes a second UE.

In some examples, to support relaying signals between the first wireless device and the second wireless device, the relay direction component 955 may be configured as or otherwise support a means for determining to relay signals in a first relay direction from the first wireless device to the second wireless device, a second relay direction from the second wireless device to the first wireless device, or both based on the indication, information acquired by the device 905 prior to receiving the indication, or both. In some examples, to support relaying signals between the first wireless device and the second wireless device, the signal relaying component 935 may be configured as or otherwise support a means for relaying, during the COT and after passing the LBT procedure, signals in the first relay direction, the second relay direction, or both based on the determining.

In some examples, to support relaying signals between the first wireless device and the second wireless device, the signal relaying component 935 may be configured as or otherwise support a means for relaying signals between the first wireless device and the second wireless device during a first portion of the COT. In some examples, to support relaying signals between the first wireless device and the second wireless device, the RF chain deactivating component 960 may be configured as or otherwise support a means for deactivating one or more RF chains of the device 905 during a second portion of the COT.

In some examples, to support relaying signals between the first wireless device and the second wireless device, the signal relaying component 935 may be configured as or otherwise support a means for relaying signals between the first wireless device and the second wireless device based on a maximum COT for the first wireless device or the second wireless device.

In some examples, to support relaying signals between the first wireless device and the second wireless device, the signal relaying component 935 may be configured as or otherwise support a means for relaying signals between the first wireless device and the second wireless device in accordance with an amplify and forward communication scheme.

In some examples, to support receiving the indication, the control signaling receiver 940 may be configured as or otherwise support a means for receiving, from the first wireless device or the second wireless device, control signaling that indicates a COT for the first wireless device or the second wireless device, a RNTI of the device 905, a DCI field value associated with the device 905, an UCI field value associated with the device 905, relay direction information, TDD information, or a combination thereof. In some examples, to support receiving the indication, the signal relaying component 935 may be configured as or otherwise support a means for determining that the device 905 is to relay signals between the first wireless device and the second wireless device based on the control signaling.

In some examples, to support receiving the indication, the COT indication receiver 925 may be configured as or otherwise support a means for receiving, from the first wireless device or the second wireless device, a preamble sequence that indicates a COT for the first wireless device or the second wireless device, where relaying signals between the first wireless device and the second wireless device is based on receiving the preamble sequence.

In some examples, the control signaling receiver 940 may be configured as or otherwise support a means for receiving control signaling that indicates a set of configuration parameters related to the preamble sequence, a set of preconfigured preamble sequences, or both, where receiving the preamble sequence is based on the control signaling.

In some examples, to support receiving the indication, the COT indication receiver 925 may be configured as or otherwise support a means for detecting an energy pattern that indicates a COT for the first wireless device or the second wireless device, where the energy pattern includes a frequency-based energy pattern or a time-based energy pattern. In some examples, to support receiving the indication, the signal relaying component 935 may be configured as or otherwise support a means for determining that the device 905 is to relay signals between the first wireless device and the second wireless device based on detecting the energy pattern.

In some examples, the control signaling receiver 940 may be configured as or otherwise support a means for receiving control signaling that indicates a set of energy thresholds, a set of preconfigured energy patterns, or both, where detecting the energy pattern is based on the control signaling.

In some examples, to support receiving the indication, the LBT type receiver 945 may be configured as or otherwise support a means for receiving an indication of an LBT procedure type for the device 905, where performing the LBT procedure is based on the LBT procedure type.

In some examples, the LBT result transmitter 950 may be configured as or otherwise support a means for transmitting a message that indicates a result of the LBT procedure, where relaying signals between the first wireless device and the second wireless device is based on transmitting the message.

In some examples, the LBT performing component 930 may be configured as or otherwise support a means for determining that the channel is occupied based on performing the LBT procedure. In some examples, the signal relaying component 935 may be configured as or otherwise support a means for refraining from relaying signals between the first wireless device and the second wireless device over the channel based on determining that the channel is occupied.

In some examples, to support relaying signals between the first wireless device and the second wireless device, the signal relaying component 935 may be configured as or otherwise support a means for relaying signals between the first wireless device and the second wireless device based on a preconfigured time offset from the indication.

Figure 10:
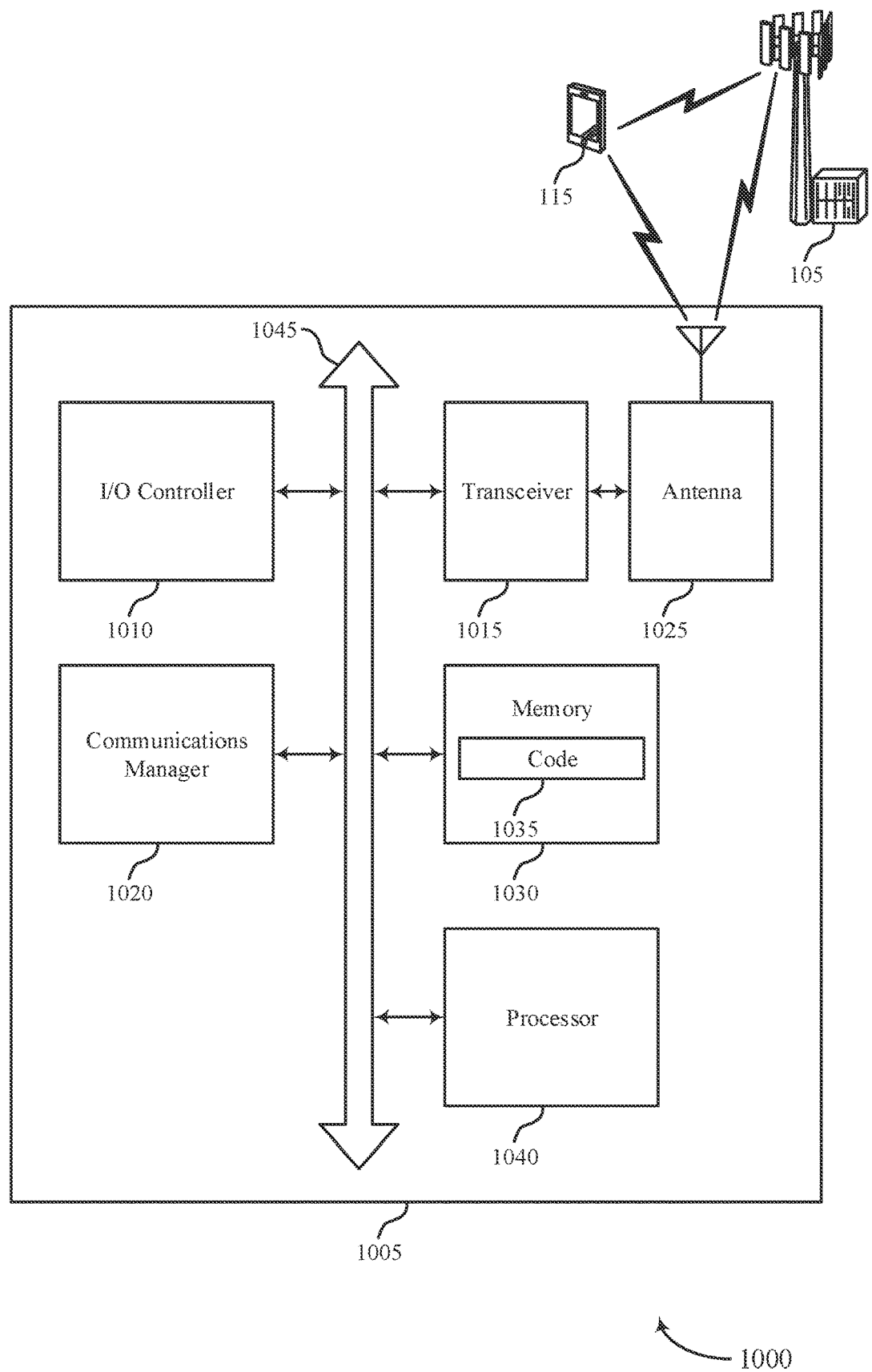
FIG. 10 shows a diagram of a system including a device that supports techniques for smart repeater operations in unlicensed bands in accordance with aspects of the present disclosure.

FIG. 10 shows a diagram of a system 1000 including a device 1005 that supports techniques for smart repeater operations in unlicensed bands in accordance with aspects of the present disclosure. The device 1005 may be an example of or include the components of a device 705, a device 805, or a relay device as described herein. The device 1005 may include components for bi-directional voice and data communications including components for transmitting and receiving communications, such as a communications manager 1020, an I/O controller 1010, a transceiver 1015, an antenna 1025, a memory 1030, code 1035, and a processor 1040. These components may be in electronic communication or otherwise coupled (e.g., operatively, communicatively, functionally, electronically, electrically) via one or more buses (e.g., a bus 1045).

The I/O controller 1010 may manage input and output signals for the device 1005. The I/O controller 1010 may also manage peripherals not integrated into the device 1005. In some cases, the I/O controller 1010 may represent a physical connection or port to an external peripheral. In some cases, the I/O controller 1010 may utilize an operating system such as iOS®, ANDROID®, MS-DOS®, MS-WINDOWS®, OS/2®, UNIX®, LINUX®, or another known operating system. Additionally or alternatively, the I/O controller 1010 may represent or interact with a modem, a keyboard, a mouse, a touchscreen, or a similar device. In some cases, the I/O controller 1010 may be implemented as part of a processor, such as the processor 1040. In some cases, a user may interact with the device 1005 via the I/O controller 1010 or via hardware components controlled by the I/O controller 1010.

In some cases, the device 1005 may include a single antenna 1025. However, in some other cases, the device 1005 may have more than one antenna 1025, which may be capable of concurrently transmitting or receiving multiple wireless transmissions. The transceiver 1015 may communicate bi-directionally, via the one or more antennas 1025, wired, or wireless links as described herein. For example, the transceiver 1015 may represent a wireless transceiver and may communicate bi-directionally with another wireless transceiver. The transceiver 1015 may also include a modem to modulate the packets, to provide the modulated packets to one or more antennas 1025 for transmission, and to demodulate packets received from the one or more antennas 1025. The transceiver 1015, or the transceiver 1015 and one or more antennas 1025, may be an example of a transmitter 715, a transmitter 815, a receiver 710, a receiver 810, or any combination thereof or component thereof, as described herein.

The memory 1030 may include random access memory (RAM) and read-only memory (ROM). The memory 1030 may store computer-readable, computer-executable code 1035 including instructions that, when executed by the processor 1040, cause the device 1005 to perform various functions described herein. The code 1035 may be stored in a non-transitory computer-readable medium such as system memory or another type of memory. In some cases, the code 1035 may not be directly executable by the processor 1040 but may cause a computer (e.g., when compiled and executed) to perform functions described herein. In some cases, the memory 1030 may contain, among other things, a basic I/O system (BIOS) which may control basic hardware or software operation such as the interaction with peripheral components or devices.

The processor 1040 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1040 may be configured to operate a memory array using a memory controller. In some other cases, a memory controller may be integrated into the processor 1040. The processor 1040 may be configured to execute computer-readable instructions stored in a memory (e.g., the memory 1030) to cause the device 1005 to perform various functions (e.g., functions or tasks supporting techniques for smart repeater operations in unlicensed bands). For example, the device 1005 or a component of the device 1005 may include a processor 1040 and memory 1030 coupled to the processor 1040, the processor 1040 and memory 1030 configured to perform various functions described herein.

The communications manager 1020 may support wireless communications at the device 1005 (e.g., a relay device) in accordance with examples as disclosed herein. For example, the communications manager 1020 may be configured as or otherwise support a means for receiving an indication that a first wireless device or a second wireless device is occupying a channel in an unlicensed RF spectrum band. The communications manager 1020 may be configured as or otherwise support a means for performing an LBT procedure on the channel based on receiving the indication. The communications manager 1020 may be configured as or otherwise support a means for relaying signals between the first wireless device and the second wireless device over the channel based on the device 1005 passing the LBT procedure.

By including or configuring the communications manager 1020 in accordance with examples as described herein, the device 1005 may support techniques for improved operational efficiency in unlicensed RF spectrum bands. For example, the described techniques may enable the device 1005 to perform an LBT procedure before relaying signals between wireless devices over a channel in an unlicensed RF spectrum band, which may reduce the likelihood of the device 1005 relaying noise (e.g., interference, extraneous signals) from the channel. Reducing the amount of noise relayed by the device 1005 may improve the operational efficiency of the device 1005, and may also increase the reliability of communications between the wireless devices.

In some examples, the communications manager 1020 may be configured to perform various operations (e.g., receiving, monitoring, transmitting) using or otherwise in cooperation with the transceiver 1015, the one or more antennas 1025, or any combination thereof. Although the communications manager 1020 is illustrated as a separate component, in some examples, one or more functions described with reference to the communications manager 1020 may be supported by or performed by the processor 1040, the memory 1030, the code 1035, or any combination thereof. For example, the code 1035 may include instructions executable by the processor 1040 to cause the device 1005 to perform various aspects of techniques for smart repeater operations in unlicensed bands as described herein, or the processor 1040 and the memory 1030 may be otherwise configured to perform or support such operations.

Figure 11:
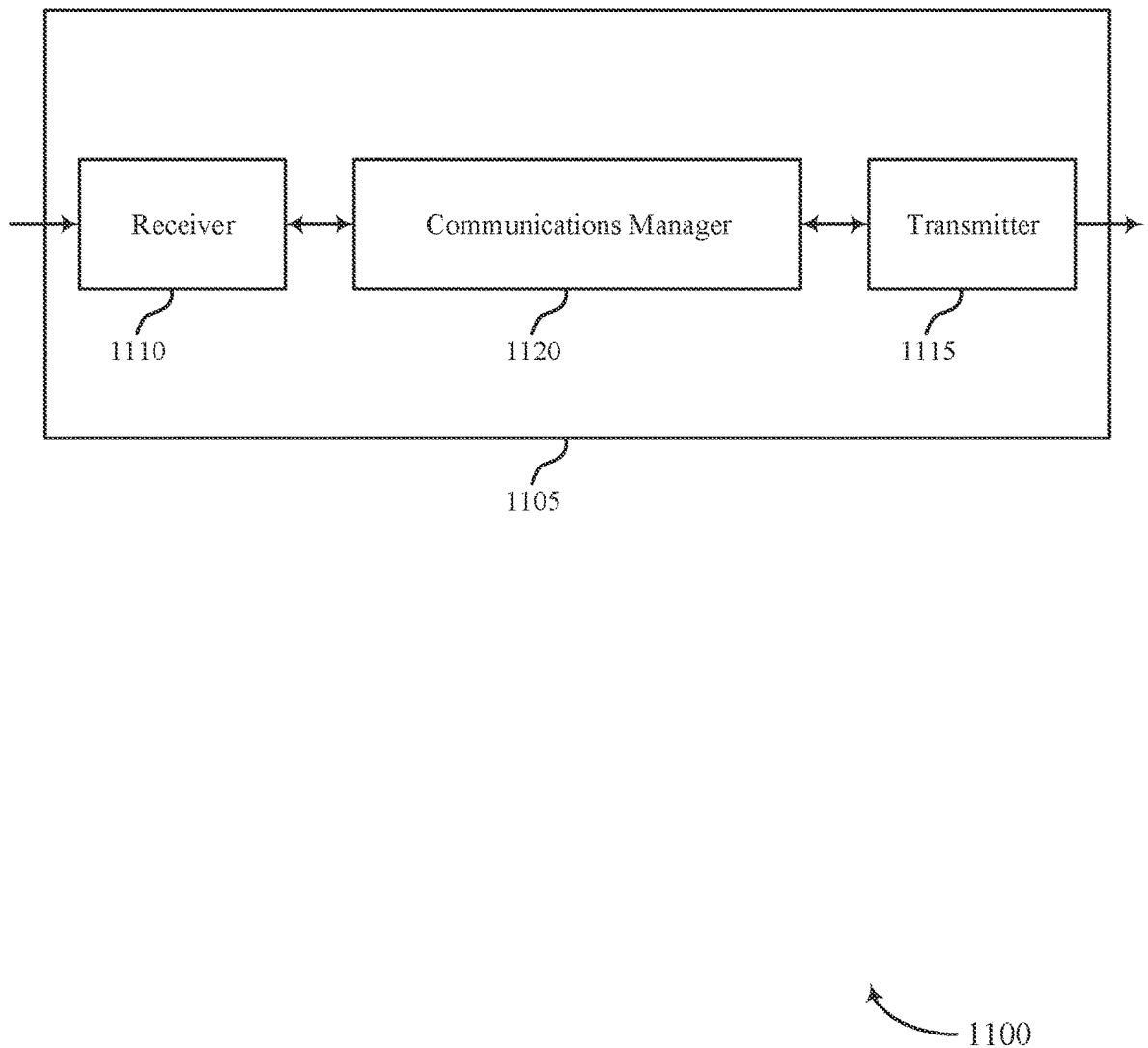
FIGS. 11 and 12 show block diagrams of devices that support techniques for smart repeater operations in unlicensed bands in accordance with aspects of the present disclosure.

FIG. 11 shows a block diagram 1100 of a device 1105 that supports techniques for smart repeater operations in unlicensed bands in accordance with aspects of the present disclosure. The device 1105 may be an example of aspects of a wireless device (e.g., a UE 115 or a base station 105) as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for smart repeater operations in unlicensed bands). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for smart repeater operations in unlicensed bands). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for smart repeater operations in unlicensed bands as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communications at the device 1105 (e.g., a first wireless device) in accordance with examples as disclosed herein. For example, the communications manager 1120 may be configured as or otherwise support a means for performing an LBT procedure on a channel in an unlicensed RF spectrum band. The communications manager 1120 may be configured as or otherwise support a means for transmitting an indication that the device 1105 is occupying the channel based on the device 1105 passing the LBT procedure. The communications manager 1120 may be configured as or otherwise support a means for communicating with a second wireless device via a relay device based on transmitting the indication.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for reduced power consumption at the device 1105. For example, the device 1105 may receive an indication of an LBT outcome from a relay device, and may determine whether to use the relay device for subsequent communications based on the LBT outcome. Determining whether to use the relay device for subsequent communications may reduce the likelihood of unsuccessful communications at the device 1105, thereby reducing a number of retransmissions performed by the device 1105. As a result, the device 1105 may remain in deep sleep mode for a longer duration, which may decrease power consumption at the device 1105, among other examples.

Figure 12:
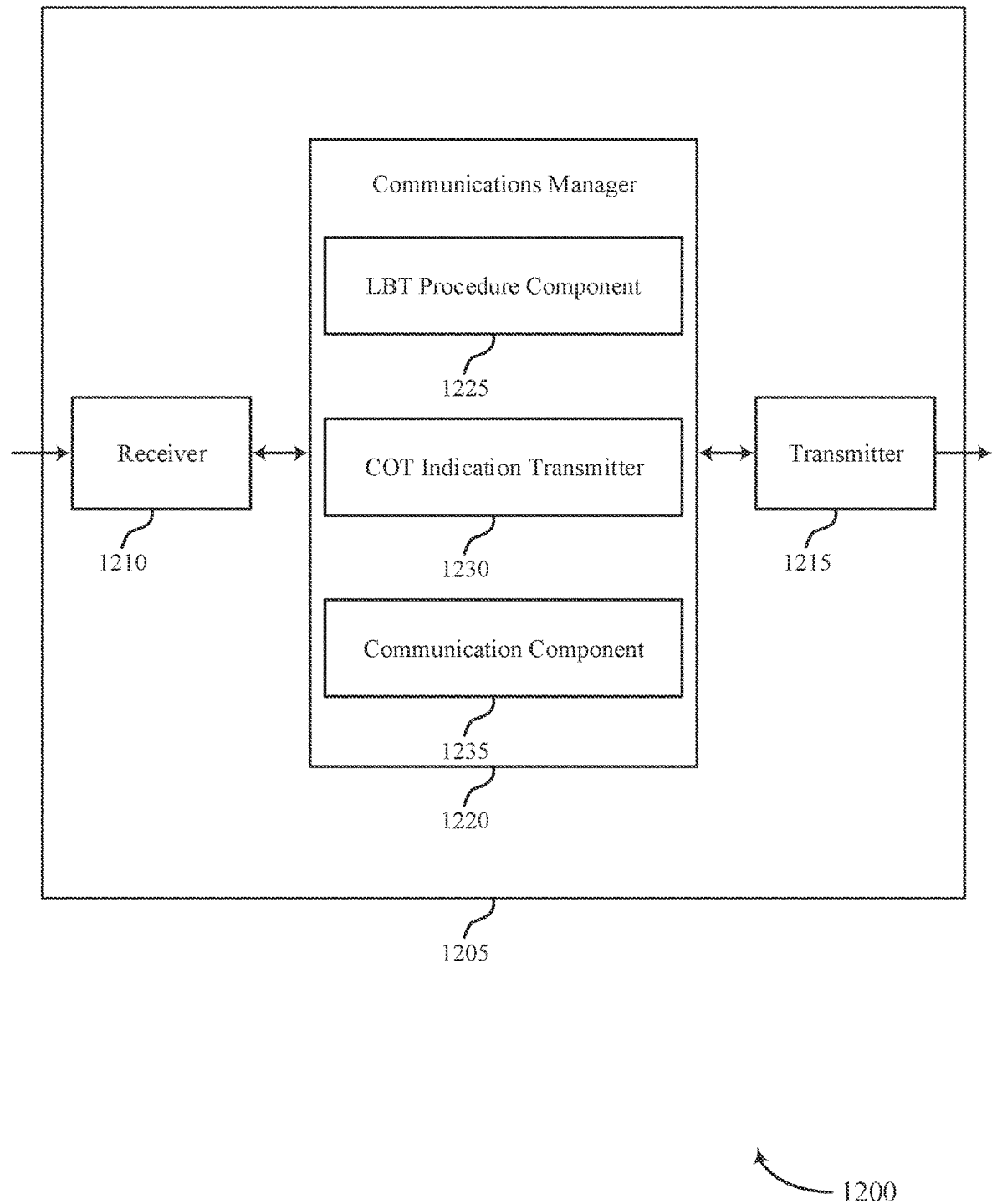

FIG. 12 shows a block diagram 1200 of a device 1205 that supports techniques for smart repeater operations in unlicensed bands in accordance with aspects of the present disclosure. The device 1205 may be an example of aspects of a device 1105 or a wireless device (e.g., a UE 115 or a base station 105) as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for smart repeater operations in unlicensed bands). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for smart repeater operations in unlicensed bands). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for smart repeater operations in unlicensed bands as described herein. For example, the communications manager 1220 may include an LBT procedure component 1225, a COT indication transmitter 1230, a communication component 1235, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communications at the device 1205 (e.g., a first wireless device) in accordance with examples as disclosed herein. The LBT procedure component 1225 may be configured as or otherwise support a means for performing an LBT procedure on a channel in an unlicensed RF spectrum band. The COT indication transmitter 1230 may be configured as or otherwise support a means for transmitting an indication that the first wireless device is occupying the channel based on the device 1205 passing the LBT procedure. The communication component 1235 may be configured as or otherwise support a means for communicating with a second wireless device via a relay device based on transmitting the indication.

Figure 13:
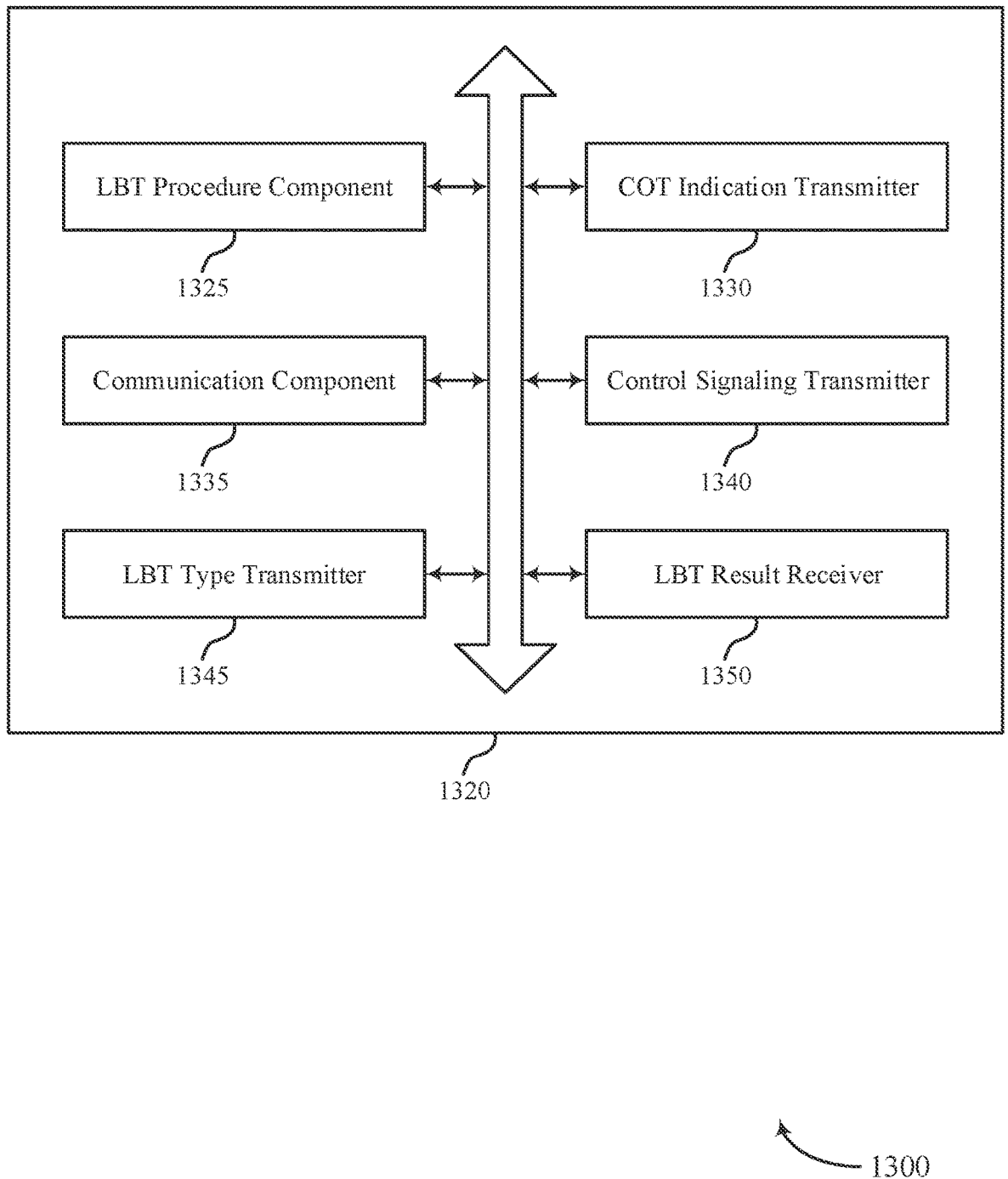
FIG. 13 shows a block diagram of a communications manager that supports techniques for smart repeater operations in unlicensed bands in accordance with aspects of the present disclosure.

FIG. 13 shows a block diagram 1300 of a communications manager 1320 that supports techniques for smart repeater operations in unlicensed bands in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for smart repeater operations in unlicensed bands as described herein. For example, the communications manager 1320 may include an LBT procedure component 1325, a COT indication transmitter 1330, a communication component 1335, a control signaling transmitter 1340, an LBT type transmitter 1345, an LBT result receiver 1350, or any combination thereof. Each of these components may communicate, directly or indirectly, with one another (e.g., via one or more buses).

The communications manager 1320 may support wireless communications at the device 1305 (e.g., a first wireless device) in accordance with examples as disclosed herein. The LBT procedure component 1325 may be configured as or otherwise support a means for performing an LBT procedure on a channel in an unlicensed RF spectrum band. The COT indication transmitter 1330 may be configured as or otherwise support a means for transmitting an indication that the device 1305 is occupying the channel based on the device 1305 passing the LBT procedure. The communication component 1335 may be configured as or otherwise support a means for communicating with a second wireless device via a relay device based on transmitting the indication.

In some examples, to support transmitting the indication, the COT indication transmitter 1330 may be configured as or otherwise support a means for transmitting an indication of a COT for the device 1305 or the second wireless device, where communicating with the second wireless device via the relay device is based on the COT.

In some examples, to support transmitting the indication, the COT indication transmitter 1330 may be configured as or otherwise support a means for transmitting, to the relay device, an indication to relay signals in a first relay direction from the device 1305 to the second wireless device, a second relay direction from the second wireless device to the device 1305, or both.

In some examples, to support transmitting the indication, the COT indication transmitter 1330 may be configured as or otherwise support a means for transmitting an indication that the relay device is to relay signals between the device 1305 and the second wireless device in accordance with an amplify and forward communication scheme.

In some examples, to support transmitting the indication, the control signaling transmitter 1340 may be configured as or otherwise support a means for transmitting control signaling that indicates a COT for the device 1305 or the second wireless device, a RNTI of the relay device, a DCI field value associated with the relay device, an UCI field value associated with the relay device, relay direction information, TDD information, or a combination thereof, where communicating with the second wireless device via the relay device is based on the control signaling.

In some examples, to support transmitting the indication, the control signaling transmitter 1340 may be configured as or otherwise support a means for transmitting control signaling that indicates a set of preamble sequence configuration parameters, a set of preconfigured preamble sequences, or both. In some examples, to support transmitting the indication, the COT indication transmitter 1330 may be configured as or otherwise support a means for transmitting, in accordance with the control signaling, a preamble sequence that indicates a COT for the device 1305 or the second wireless device.

In some examples, to support transmitting the indication, the control signaling transmitter 1340 may be configured as or otherwise support a means for transmitting control signaling that indicates a set of energy thresholds, a set of preconfigured energy patterns, or both. In some examples, to support transmitting the indication, the COT indication transmitter 1330 may be configured as or otherwise support a means for transmitting, in accordance with the control signaling, an energy pattern that indicates a COT for the device 1305 or the second wireless device.

In some examples, to support transmitting the indication, the LBT type transmitter 1345 may be configured as or otherwise support a means for transmitting an indication of an LBT procedure type for the relay device, where communicating with the second wireless device via the relay device is based on the LBT procedure type.

In some examples, the LBT result receiver 1350 may be configured as or otherwise support a means for receiving, from the relay device, a message that indicates a result of an LBT procedure performed by the relay device. In some examples, the communication component 1335 may be configured as or otherwise support a means for determining whether to communicate with the second wireless device via the relay device based on the result of the LBT procedure performed by the relay device.

In some examples, to support communicating with the second wireless device via the relay device, the communication component 1335 may be configured as or otherwise support a means for communicating with the second wireless device via the relay device based on a preconfigured time offset from the indication.

Figure 14:
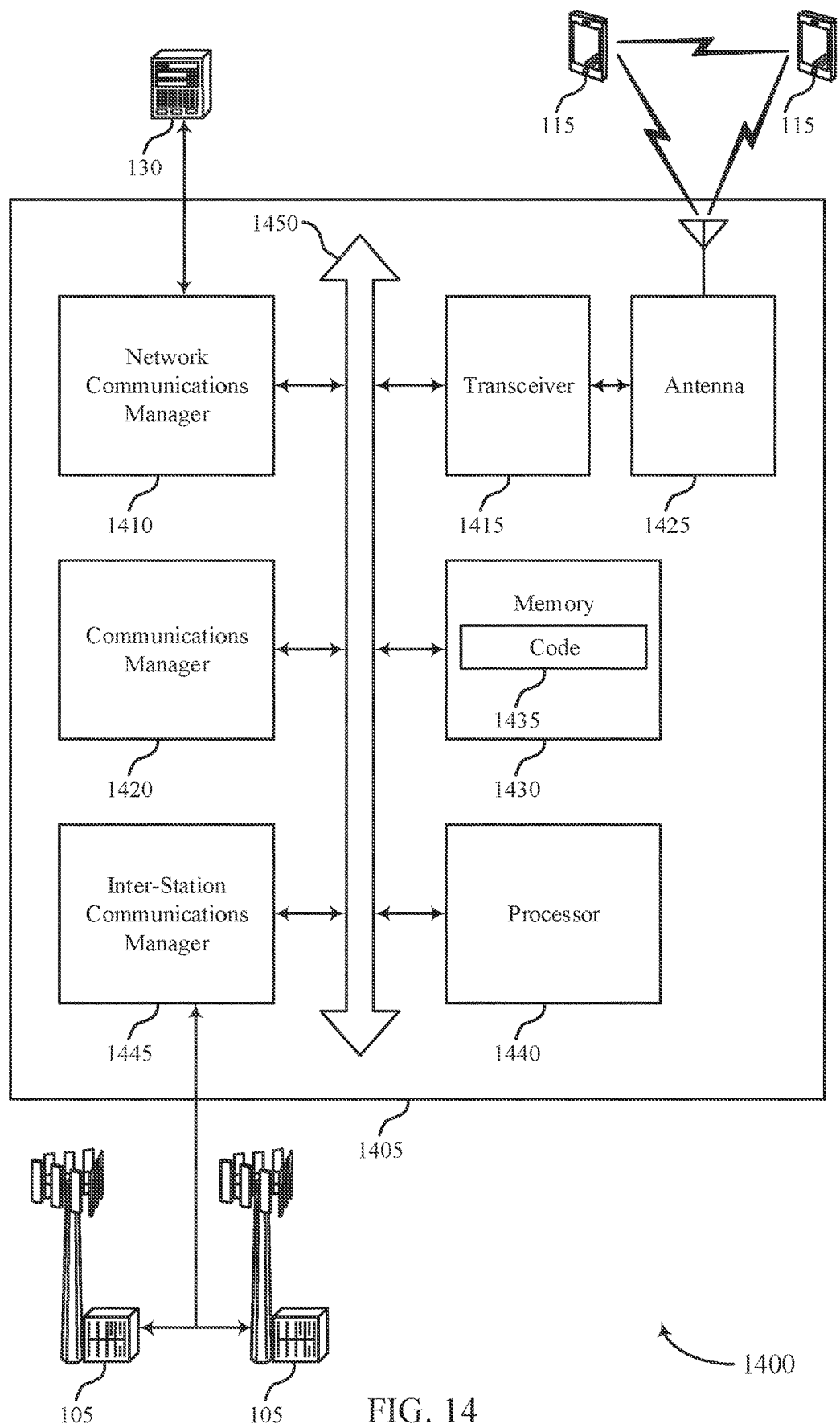
FIG. 14 shows a diagram of a system including a device that supports techniques for smart repeater operations in unlicensed bands in accordance with aspects of the present disclosure.

FIG. 14 shows a diagram of a system 1400 including a device 1405 that supports techniques for smart repeater operations in unlicensed bands in accordance with aspects of the present disclosure. The device 1405 may be an example of or include the components of a device 1105, a device 1205, or a wireless device (e.g., a UE 115 or a base station 105) as described herein. The device 1405 may include components for bi-directional voice and data communications including components for transmitting and receiving communications, such as a communications manager 1420, a network communications manager 1410, a transceiver 1415, an antenna 1425, a memory 1430, code 1435, a processor 1440, and an inter-station communications manager 1445. These components may be in electronic communication or otherwise coupled (e.g., operatively, communicatively, functionally, electronically, electrically) via one or more buses (e.g., a bus 1450).

The network communications manager 1410 may manage communications with a core network 130 (e.g., via one or more wired backhaul links). For example, the network communications manager 1410 may manage the transfer of data communications for client devices, such as one or more UEs 115.

In some cases, the device 1405 may include a single antenna 1425. However, in some other cases the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include RAM and ROM. The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a BIOS which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for smart repeater operations in unlicensed bands). For example, the device 1405 or a component of the device 1405 may include a processor 1440 and memory 1430 coupled to the processor 1440, the processor 1440 and memory 1430 configured to perform various functions described herein.

The inter-station communications manager 1445 may manage communications with other base stations 105, and may include a controller or scheduler for controlling communications with UEs 115 in cooperation with other base stations 105. For example, the inter-station communications manager 1445 may coordinate scheduling for transmissions to UEs 115 for various interference mitigation techniques such as beamforming or joint transmission. In some examples, the inter-station communications manager 1445 may provide an X2 interface within an LTE/LTE-A wireless communications network technology to provide communication between base stations 105.

The communications manager 1420 may support wireless communications at the device 1405 (e.g., a first wireless device) in accordance with examples as disclosed herein. For example, the communications manager 1420 may be configured as or otherwise support a means for performing an LBT procedure on a channel in an unlicensed RF spectrum band. The communications manager 1420 may be configured as or otherwise support a means for transmitting an indication that the device 1405 is occupying the channel based on the device 1405 passing the LBT procedure. The communications manager 1420 may be configured as or otherwise support a means for communicating with a second wireless device via a relay device based on transmitting the indication.

By including or configuring the communications manager 1420 in accordance with examples as described herein, the device 1405 may support techniques for improved communication reliability at the device 1405. For example, the described techniques may enable the device 1405 to transmit a COT indication to a relay device. Accordingly, the device 1405 may use the relay device to communicate with a wireless device over a channel in an unlicensed RF spectrum band, which may increase the likelihood of the device 1405 successfully communicating with the wireless device over the channel.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for smart repeater operations in unlicensed bands as described herein, or the processor 1440 and the memory 1430 may be otherwise configured to perform or support such operations.

Figure 15:
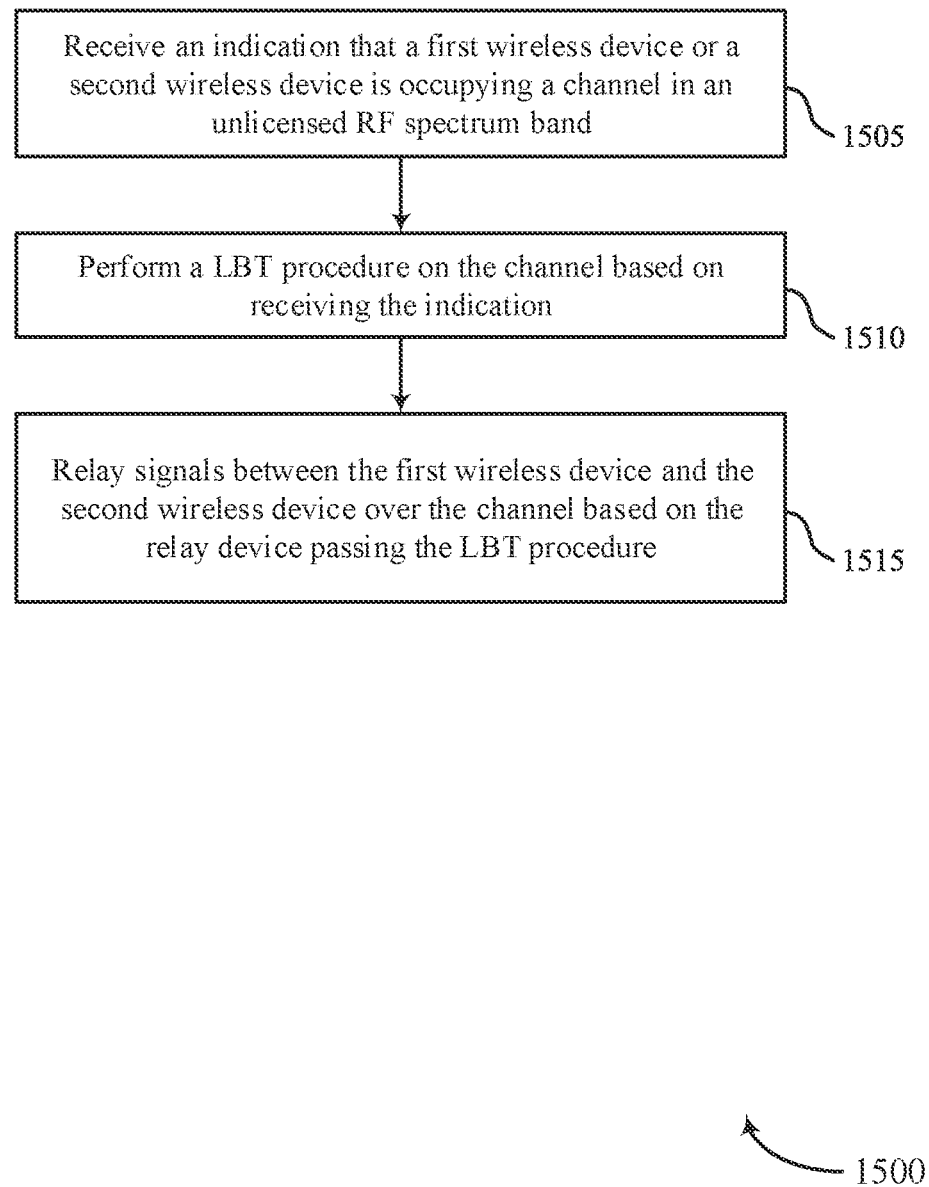
FIGS. 15 through 18 show flowcharts illustrating methods that support techniques for smart repeater operations in unlicensed bands in accordance with aspects of the present disclosure.

FIG. 15 shows a flowchart illustrating a method 1500 that supports techniques for smart repeater operations in unlicensed bands in accordance with aspects of the present disclosure. The operations of the method 1500 may be implemented by a relay device (e.g., a smart repeater) or its components as described herein. For example, the operations of the method 1500 may be performed by a relay device as described with reference to FIGS. 1 through 10. In some examples, a relay device may execute a set of instructions to control the functional elements of the relay device to perform the described functions. Additionally or alternatively, the relay device may perform aspects of the described functions using special-purpose hardware.

At 1505, the method may include receiving an indication that a first wireless device (e.g., a UE 115 or a base station 105) or a second wireless device (e.g., a UE 115 or a base station 105) is occupying a channel in an unlicensed RF spectrum band. The operations of 1505 may be performed in accordance with examples as disclosed herein. In some examples, aspects of the operations of 1505 may be performed by a COT indication receiver 925 as described with reference to FIG. 9.

At 1510, the method may include performing an LBT procedure on the channel based on receiving the indication. The operations of 1510 may be performed in accordance with examples as disclosed herein. In some examples, aspects of the operations of 1510 may be performed by an LBT performing component 930 as described with reference to FIG. 9.

At 1515, the method may include relaying signals between the first wireless device and the second wireless device over the channel based on the relay device passing the LBT procedure. The operations of 1515 may be performed in accordance with examples as disclosed herein. In some examples, aspects of the operations of 1515 may be performed by a signal relaying component 935 as described with reference to FIG. 9.

Figure 16:
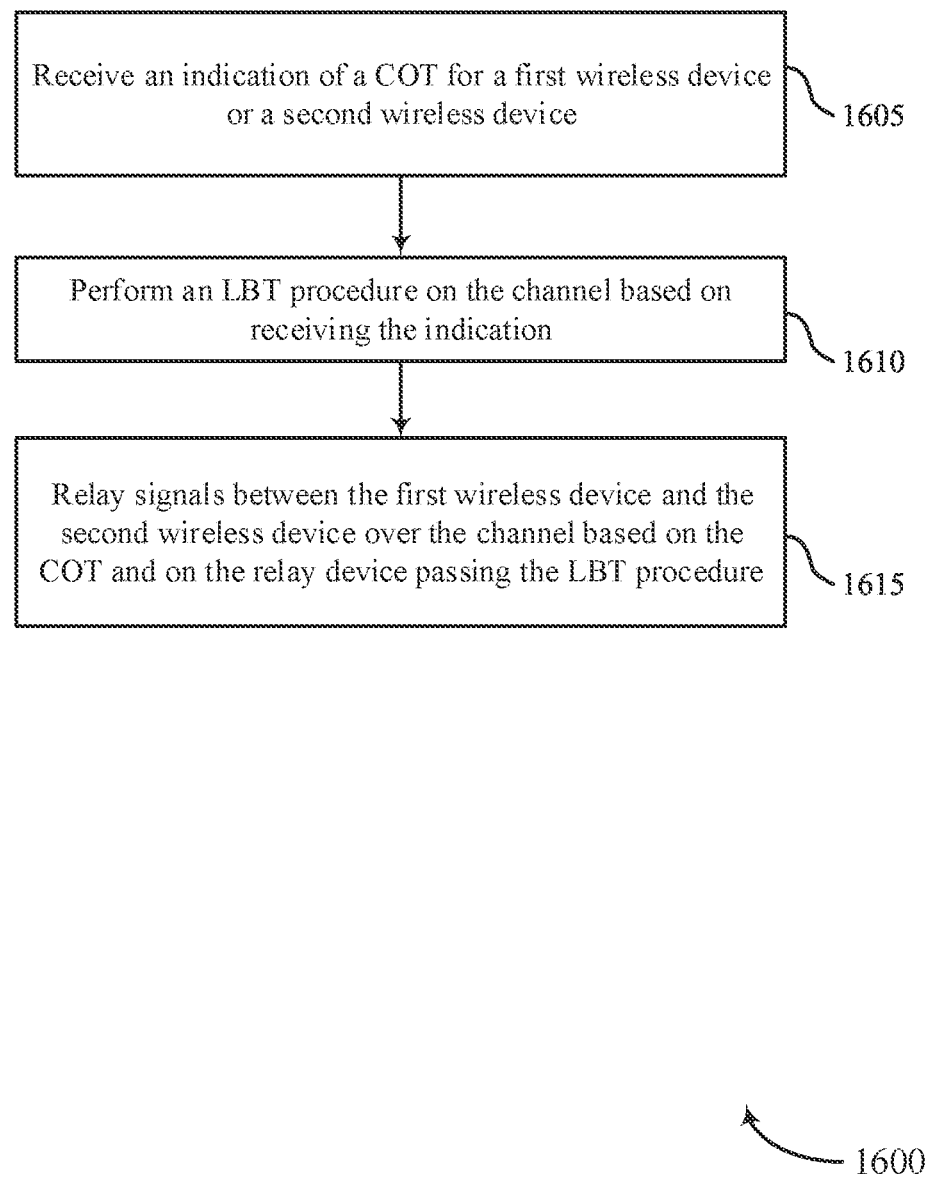

FIG. 16 shows a flowchart illustrating a method 1600 that supports techniques for smart repeater operations in unlicensed bands in accordance with aspects of the present disclosure. The operations of the method 1600 may be implemented by a relay device (e.g., a smart repeater) or its components as described herein. For example, the operations of the method 1600 may be performed by a relay device as described with reference to FIGS. 1 through 10. In some examples, a relay device may execute a set of instructions to control the functional elements of the relay device to perform the described functions. Additionally or alternatively, the relay device may perform aspects of the described functions using special-purpose hardware.

At 1605, the method may include receiving an indication of a COT for a first wireless device (e.g., a UE 115 or a base station 105) or a second wireless device (e.g., a UE 115 or a base station 105). The operations of 1605 may be performed in accordance with examples as disclosed herein. In some examples, aspects of the operations of 1605 may be performed by a COT indication receiver 925 as described with reference to FIG. 9.

At 1610, the method may include performing an LBT procedure on the channel based on receiving the indication. The operations of 1610 may be performed in accordance with examples as disclosed herein. In some examples, aspects of the operations of 1610 may be performed by an LBT performing component 930 as described with reference to FIG. 9.

At 1615, the method may include relaying signals between the first wireless device and the second wireless device over the channel based on the COT and on the relay device passing the LBT procedure. The operations of 1615 may be performed in accordance with examples as disclosed herein. In some examples, aspects of the operations of 1615 may be performed by a signal relaying component 935 as described with reference to FIG. 9.

Figure 17:
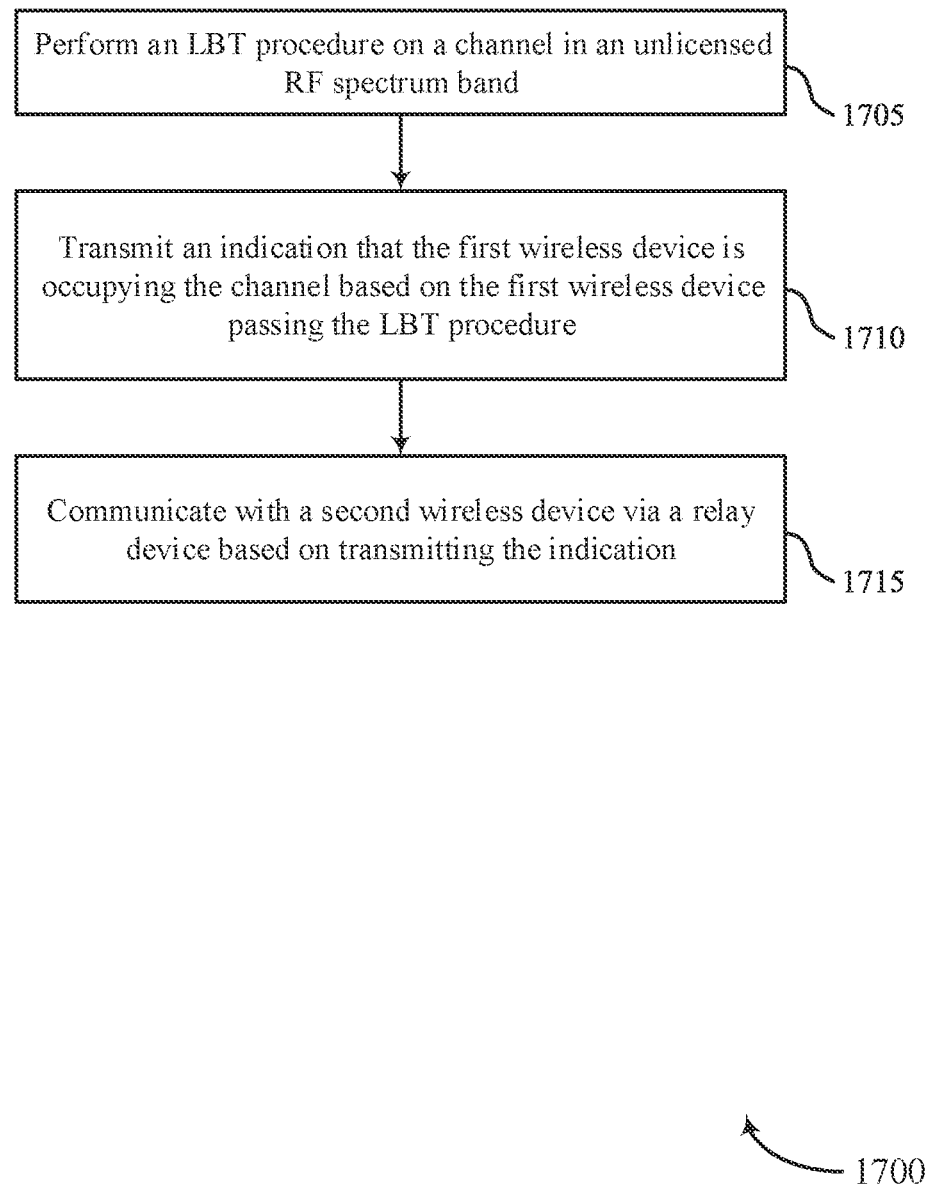

FIG. 17 shows a flowchart illustrating a method 1700 that supports techniques for smart repeater operations in unlicensed bands in accordance with aspects of the present disclosure. The operations of the method 1700 may be implemented by a first wireless device (e.g., a UE 115 or a base station 105) or its components as described herein. For example, the operations of the method 1700 may be performed by a wireless device as described with reference to FIGS. 1 through 6 and 11 through 14. In some examples, a wireless device may execute a set of instructions to control the functional elements of the wireless device to perform the described functions. Additionally or alternatively, the wireless device may perform aspects of the described functions using special-purpose hardware.

At 1705, the method may include performing an LBT procedure on a channel in an unlicensed RF spectrum band. The operations of 1705 may be performed in accordance with examples as disclosed herein. In some examples, aspects of the operations of 1705 may be performed by an LBT procedure component 1325 as described with reference to FIG. 13.

At 1710, the method may include transmitting an indication that the first wireless device is occupying the channel based on the first wireless device passing the LBT procedure. The operations of 1710 may be performed in accordance with examples as disclosed herein. In some examples, aspects of the operations of 1710 may be performed by a COT indication transmitter 1330 as described with reference to FIG. 13.

At 1715, the method may include communicating with a second wireless device (e.g., a UE 115 or a base station 105) via a relay device (e.g., a smart repeater) based on transmitting the indication. The operations of 1715 may be performed in accordance with examples as disclosed herein. In some examples, aspects of the operations of 1715 may be performed by a communication component 1335 as described with reference to FIG. 13.

Figure 18:
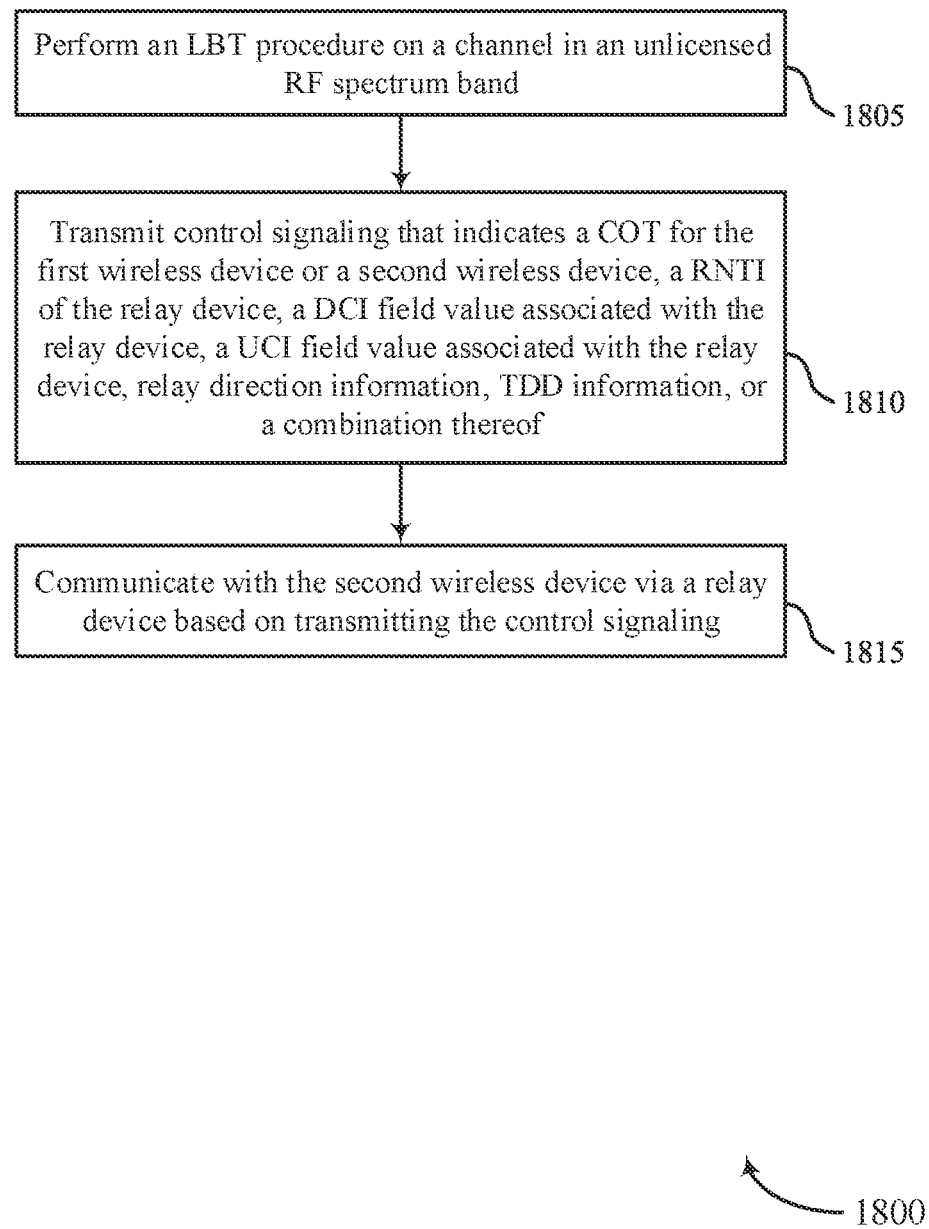

FIG. 18 shows a flowchart illustrating a method 1800 that supports techniques for smart repeater operations in unlicensed bands in accordance with aspects of the present disclosure. The operations of the method 1800 may be implemented by a first wireless device (e.g., a UE 115 or a base station 105) or its components as described herein. For example, the operations of the method 1800 may be performed by a wireless device as described with reference to FIGS. 1 through 6 and 11 through 14. In some examples, a wireless device may execute a set of instructions to control the functional elements of the wireless device to perform the described functions. Additionally or alternatively, the wireless device may perform aspects of the described functions using special-purpose hardware.

At 1805, the method may include performing an LBT procedure on a channel in an unlicensed RF spectrum band. The operations of 1805 may be performed in accordance with examples as disclosed herein. In some examples, aspects of the operations of 1805 may be performed by an LBT procedure component 1325 as described with reference to FIG. 13.

At 1810, the method may include transmitting control signaling that indicates a COT for the first wireless device or a second wireless device, a RNTI of the relay device, a DCI field value associated with the relay device, a UCI field value associated with the relay device, relay direction information, TDD information, or a combination thereof. The operations of 1810 may be performed in accordance with examples as disclosed herein. In some examples, aspects of the operations of 1810 may be performed by a control signaling transmitter 1340 as described with reference to FIG. 13.

At 1815, the method may include communicating with a second wireless device (e.g., a UE 115 or a base station 105) via a relay device (e.g., a smart repeater) based on transmitting the control signaling. The operations of 1815 may be performed in accordance with examples as disclosed herein. In some examples, aspects of the operations of 1815 may be performed by a communication component 1335 as described with reference to FIG. 13.

The following provides an overview of aspects of the present disclosure:

Aspect 1: A method for wireless communications at a relay device, comprising: receiving an indication that a first wireless device or a second wireless device is occupying a channel in an unlicensed radio frequency spectrum band; performing a listen before talk procedure on the channel based at least in part on receiving the indication; and relaying signals between the first wireless device and the second wireless device over the channel based at least in part on the relay device passing the listen before talk procedure.

Aspect 2: The method of aspect 1, wherein receiving the indication comprises: receiving an indication of a channel occupancy time for the first wireless device or the second wireless device, wherein relaying signals between the first wireless device and the second wireless device is based at least in part on the channel occupancy time.

Aspect 3: The method of aspect 2, wherein relaying signals between the first wireless device and the second wireless device comprises: determining to relay signals in a first relay direction from the first wireless device to the second wireless device, a second relay direction from the second wireless device to the first wireless device, or both based at least in part on the indication, information acquired by the relay device prior to receiving the indication, or both; and relaying, during the channel occupancy time and after passing the listen before talk procedure, signals in the first relay direction, the second relay direction, or both based at least in part on the determining.

Aspect 4: The method of any of aspects 2 through 3, wherein relaying signals between the first wireless device and the second wireless device comprises: relaying signals between the first wireless device and the second wireless device during a first portion of the channel occupancy time; and deactivating one or more radio frequency chains of the relay device during a second portion of the channel occupancy time.

Aspect 5: The method of any of aspects 1 through 4, wherein relaying signals between the first wireless device and the second wireless device comprises: relaying signals between the first wireless device and the second wireless device based at least in part on a maximum channel occupancy time for the first wireless device or the second wireless device.

Aspect 6: The method of any of aspects 1 through 5, wherein relaying signals between the first wireless device and the second wireless device comprises: relaying signals between the first wireless device and the second wireless device in accordance with an amplify and forward communication scheme.

Aspect 7: The method of any of aspects 1 through 6, wherein receiving the indication comprises: receiving, from the first wireless device or the second wireless device, control signaling that indicates a channel occupancy time for the first wireless device or the second wireless device, a radio network temporary identifier of the relay device, a downlink control information field value associated with the relay device, an uplink control information field value associated with the relay device, relay direction information, time division duplexing information, or a combination thereof; and determining that the relay device is to relay signals between the first wireless device and the second wireless device based at least in part on the control signaling.

Aspect 8: The method of any of aspects 1 through 7, wherein receiving the indication comprises: receiving, from the first wireless device or the second wireless device, a preamble sequence that indicates a channel occupancy time for the first wireless device or the second wireless device, wherein relaying signals between the first wireless device and the second wireless device is based at least in part on receiving the preamble sequence.

Aspect 9: The method of aspect 8, further comprising: receiving control signaling that indicates a set of configuration parameters related to the preamble sequence, a set of preconfigured preamble sequences, or both, wherein receiving the preamble sequence is based at least in part on the control signaling.

Aspect 10: The method of any of aspects 1 through 9, wherein receiving the indication comprises: detecting an energy pattern that indicates a channel occupancy time for the first wireless device or the second wireless device, wherein the energy pattern comprises a frequency-based energy pattern or a time-based energy pattern; and determining that the relay device is to relay signals between the first wireless device and the second wireless device based at least in part on detecting the energy pattern.

Aspect 11: The method of aspect 10, further comprising: receiving control signaling that indicates a set of energy thresholds, a set of preconfigured energy patterns, or both, wherein detecting the energy pattern is based at least in part on the control signaling.

Aspect 12: The method of any of aspects 1 through 11, wherein receiving the indication comprises: receiving an indication of a listen before talk procedure type for the relay device, wherein performing the listen before talk procedure is based at least in part on the listen before talk procedure type.

Aspect 13: The method of any of aspects 1 through 12, further comprising: transmitting a message that indicates a result of the listen before talk procedure, wherein relaying signals between the first wireless device and the second wireless device is based at least in part on transmitting the message.

Aspect 14: The method of any of aspects 1 through 13, further comprising: determining that the channel is occupied based at least in part on performing the listen before talk procedure; and refraining from relaying signals between the first wireless device and the second wireless device over the channel based at least in part on determining that the channel is occupied.

Aspect 15: The method of any of aspects 1 through 14, wherein relaying signals between the first wireless device and the second wireless device comprises: relaying signals between the first wireless device and the second wireless device based at least in part on a preconfigured time offset from the indication.

Aspect 16: The method of any of aspects 1 through 15, wherein the first wireless device comprises a base station and the second wireless device comprises a UE.

Aspect 17: The method of any of aspects 1 through 16, wherein the first wireless device comprises a first UE and the second wireless device comprises a second UE.

Aspect 18: A method for wireless communications at a first wireless device, comprising: performing a listen before talk procedure on a channel in an unlicensed radio frequency spectrum band; transmitting an indication that the first wireless device is occupying the channel based at least in part on the first wireless device passing the listen before talk procedure; and communicating with a second wireless device via a relay device based at least in part on transmitting the indication.

Aspect 19: The method of aspect 18, wherein transmitting the indication comprises: transmitting an indication of a channel occupancy time for the first wireless device or the second wireless device, wherein communicating with the second wireless device via the relay device is based at least in part on the channel occupancy time.

Aspect 20: The method of aspect 19, wherein transmitting the indication comprises: transmitting, to the relay device, an indication to relay signals in a first relay direction from the first wireless device to the second wireless device, a second relay direction from the second wireless device to the first wireless device, or both.

Aspect 21: The method of any of aspects 18 through 20, wherein transmitting the indication comprises: transmitting an indication that the relay device is to relay signals between the first wireless device and the second wireless device in accordance with an amplify and forward communication scheme.

Aspect 22: The method of any of aspects 18 through 21, wherein transmitting the indication comprises: transmitting control signaling that indicates a channel occupancy time for the first wireless device or the second wireless device, a radio network temporary identifier of the relay device, a downlink control information field value associated with the relay device, an uplink control information field value associated with the relay device, relay direction information, time division duplexing information, or a combination thereof, wherein communicating with the second wireless device via the relay device is based at least in part on the control signaling.

Aspect 23: The method of any of aspects 18 through 22, wherein transmitting the indication comprises: transmitting control signaling that indicates a set of preamble sequence configuration parameters, a set of preconfigured preamble sequences, or both; and transmitting, in accordance with the control signaling, a preamble sequence that indicates a channel occupancy time for the first wireless device or the second wireless device.

Aspect 24: The method of any of aspects 18 through 23, wherein transmitting the indication comprises: transmitting control signaling that indicates a set of energy thresholds, a set of preconfigured energy patterns, or both; and transmitting, in accordance with the control signaling, an energy pattern that indicates a channel occupancy time for the first wireless device or the second wireless device.

Aspect 25: The method of any of aspects 18 through 24, wherein transmitting the indication comprises: transmitting an indication of a listen before talk procedure type for the relay device, wherein communicating with the second wireless device via the relay device is based at least in part on the listen before talk procedure type.

Aspect 26: The method of any of aspects 18 through 25, further comprising: receiving, from the relay device, a message that indicates a result of a listen before talk procedure performed by the relay device; and determining whether to communicate with the second wireless device via the relay device based at least in part on the result of the listen before talk procedure performed by the relay device.

Aspect 27: The method of any of aspects 18 through 26, wherein communicating with the second wireless device via the relay device comprises: communicating with the second wireless device via the relay device based at least in part on a preconfigured time offset from the indication.

Aspect 28: An apparatus for wireless communications at a relay device, comprising a processor; memory coupled with the processor; and instructions stored in the memory and executable by the processor to cause the apparatus to perform a method of any of aspects 1 through 17.

Aspect 29: An apparatus for wireless communications at a relay device, comprising at least one means for performing a method of any of aspects 1 through 17.

Aspect 30: A non-transitory computer-readable medium storing code for wireless communications at a relay device, the code comprising instructions executable by a processor to perform a method of any of aspects 1 through 17.

Aspect 31: An apparatus for wireless communications at a first wireless device, comprising a processor; memory coupled with the processor; and instructions stored in the memory and executable by the processor to cause the apparatus to perform a method of any of aspects 18 through 27.

Aspect 32: An apparatus for wireless communications at a first wireless device, comprising at least one means for performing a method of any of aspects 18 through 27.

Aspect 33: A non-transitory computer-readable medium storing code for wireless communications at a first wireless device, the code comprising instructions executable by a processor to perform a method of any of aspects 18 through 27.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on." Also, as used herein, the phrase "a set" shall be construed as including the possibility of a set with one member. That is, the phrase "a set" shall be construed in the same manner as "one or more."

The term "determine" or "determining" encompasses a wide variety of actions and, therefore, "determining" can include calculating, computing, processing, deriving, investigating, looking up (such as via looking up in a table, a database or another data structure), ascertaining and the like. Also, "determining" can include receiving (such as receiving information), accessing (such as accessing data in a memory) and the like. Also, "determining" can include resolving, selecting, choosing, establishing and other such similar actions.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communications at a relay device, comprising:
    at least one processor;
    at least one memory coupled with the at least one processor; and
    instructions stored in the at least one memory and executable by the at least one processor to cause the apparatus to:
        receive control signaling indicating a channel occupancy time allocated for a first wireless device or a second wireless device and indicating a set of energy patterns, each energy pattern of the set of energy patterns comprising an on-off pattern including one or more on durations associated with a first energy level and one or more off durations associated with a second energy level;
        receive a first signal comprising a first indication that the first wireless device or the second wireless device is occupying a channel in an unlicensed radio frequency spectrum band, wherein the first indication is based at least in part on the first signal having a first energy pattern of the set of energy patterns;
        perform, by the relay device and based at least in part on receiving the first indication, a listen before talk procedure on the channel during the channel occupancy time allocated for the first wireless device or the second wireless device, wherein the channel is occupied by the first wireless device or the second wireless device during the channel occupancy time; and
        relay signals between the first wireless device and the second wireless device over the channel during the channel occupancy time based at least in part on the relay device passing the listen before talk procedure and based at least in part on the first indication.

2. The apparatus of claim 1, wherein the instructions to relay signals between the first wireless device and the second wireless device are executable by the at least one processor to cause the apparatus to:
    determine to relay the signals in a first relay direction from the first wireless device to the second wireless device, a second relay direction from the second wireless device to the first wireless device, or both based at least in part on the first indication, information acquired by the relay device prior to receiving the first indication, or both; and
    relay, during the channel occupancy time and after passing the listen before talk procedure, the signals in one or both of the first relay direction and the second relay direction based at least in part on the determining.

3. The apparatus of claim 1, wherein the instructions to relay signals between the first wireless device and the second wireless device are executable by the at least one processor to cause the apparatus to:
    relay the signals between the first wireless device and the second wireless device during a first portion of the channel occupancy time; and
    deactivate one or more radio frequency chains of the relay device during a second portion of the channel occupancy time.

4. The apparatus of claim 1, wherein the instructions to relay the signals between the first wireless device and the second wireless device are executable by the at least one processor to cause the apparatus to:
    relay the signals between the first wireless device and the second wireless device based at least in part on a maximum channel occupancy time for the first wireless device or the second wireless device.

5. The apparatus of claim 1, wherein the instructions to relay signals between the first wireless device and the second wireless device are executable by the at least one processor to cause the apparatus to:
    relay the signals between the first wireless device and the second wireless device in accordance with an amplify and forward communication scheme.

6. The apparatus of claim 1, wherein the control signaling further indicates a radio network temporary identifier of the relay device, a downlink control information field value associated with the relay device, an uplink control information field value associated with the relay device, relay direction information, time division duplexing information, or a combination thereof, and wherein the instructions are further executable by the at least one processor to cause the apparatus to:
    determine that the relay device is to relay the signals between the first wireless device and the second wireless device based at least in part on the control signaling.

7. The apparatus of claim 1, wherein the instructions to receive the first signal are executable by the at least one processor to cause the apparatus to:
    receive, from the first wireless device or the second wireless device, a preamble sequence that indicates the first wireless device or the second wireless device is occupying the channel, wherein relaying the signals between the first wireless device and the second wireless device is based at least in part on receiving the preamble sequence.

8. The apparatus of claim 7, wherein the instructions are further executable by the at least one processor to cause the apparatus to:
    receive, via the control signaling, an indication of a set of configuration parameters related to the preamble sequence, a set of preconfigured preamble sequences, or both, wherein receiving the preamble sequence is based at least in part on the control signaling.

9. The apparatus of claim 1, wherein the instructions to receive the first signal are executable by the at least one processor to cause the apparatus to:
    detect the first energy pattern that indicates the first wireless device or the second wireless device is occupying the channel, wherein the first energy pattern comprises a frequency-based energy pattern or a time-based energy pattern; and determine that the relay device is to relay the signals between the first wireless device and the second wireless device based at least in part on detecting the first energy pattern.

10. The apparatus of claim 9, wherein the instructions are further executable by the at least one processor to cause the apparatus to:
receive, via the control signaling, an indication of a set of energy thresholds, wherein detecting the first energy pattern is further based at least in part on the set of energy thresholds.

11. The apparatus of claim 1, wherein the instructions to receive the first signal are executable by the at least one processor to cause the apparatus to:
receive a second indication of a listen before talk procedure type for the relay device, wherein performing the listen before talk procedure is based at least in part on the listen before talk procedure type.

12. The apparatus of claim 1, wherein the instructions are further executable by the at least one processor to cause the apparatus to:
transmit a message that indicates a result of the listen before talk procedure, wherein relaying the signals between the first wireless device and the second wireless device is based at least in part on transmitting the message.

13. The apparatus of claim 1, wherein the instructions are further executable by the at least one processor to cause the apparatus to:
determine that the channel is occupied based at least in part on performing the listen before talk procedure; and
refrain from relaying the signals between the first wireless device and the second wireless device over the channel based at least in part on determining that the channel is occupied.

14. The apparatus of claim 1, wherein the instructions to relay signals between the first wireless device and the second wireless device are executable by the at least one processor to cause the apparatus to:
relay the signals between the first wireless device and the second wireless device based at least in part on a preconfigured time offset from the first indication.

15. The apparatus of claim 1, wherein the first wireless device comprises a network device and the second wireless device comprises a user equipment (UE).

16. The apparatus of claim 1, wherein the first wireless device comprises a first user equipment (UE) and the second wireless device comprises a second UE.

17. The apparatus of claim 1, wherein:
the one or more on durations of the on-off pattern are in accordance with the first energy level being greater than a first energy threshold over a time window, a frequency window, or both,
the one or more off durations of the on-off pattern are in accordance with the second energy level less than a second energy threshold over the time window, the frequency window, or both, and
the second energy threshold is less than the first energy threshold.

18. The apparatus of claim 1, wherein the one or more off durations of the on-off pattern are less than a threshold duration associated with maintaining the channel occupancy time.

19. An apparatus for wireless communications at a first wireless device, comprising:
at least one processor;
at least one memory coupled with the at least one processor; and
instructions stored in the at least one memory and executable by the at least one processor to cause the apparatus to:
transmit control signaling indicating a channel occupancy time for the first wireless device or a second wireless device and indicating a set of energy patterns, each energy pattern of the set of energy patterns comprising an on-off pattern including one or more on durations associated with a first energy level and one or more off durations associated with a second energy level;
perform a listen before talk procedure on a channel in an unlicensed radio frequency spectrum band during the channel occupancy time allocated for the first wireless device or the second wireless device;
transmit a first signal comprising a first indication that the first wireless device is occupying the channel based at least in part on the first wireless device passing the listen before talk procedure, wherein the first indication is based at least in part on the first signal having a first energy pattern of the set of energy patterns; and
use the channel to communicate with the second wireless device via a relay device based at least in part on transmitting the first indication, wherein transmission of the first indication triggers, at the relay device, a second listen before talk procedure on the channel during the channel occupancy time and based at least in part on the first indication.

20. The apparatus of claim 19, wherein the instructions to transmit the first signal are executable by the at least one processor to cause the apparatus to:
transmit, to the relay device, a second indication to relay signals in a first relay direction from the first wireless device to the second wireless device, a second relay direction from the second wireless device to the first wireless device, or both.

21. The apparatus of claim 19, wherein the instructions to transmit the first signal are executable by the at least one processor to cause the apparatus to:
transmit a second indication that the relay device is to relay signals between the first wireless device and the second wireless device in accordance with an amplify and forward communication scheme.

22. The apparatus of claim 19, wherein the control signaling further indicates a radio network temporary identifier of the relay device, a downlink control information field value associated with the relay device, an uplink control information field value associated with the relay device, relay direction information, time division duplexing information, or a combination thereof, wherein communicating with the second wireless device via the relay device is based at least in part on the control signaling.

23. The apparatus of claim 19, wherein the instructions to transmit the first signal are executable by the at least one processor to cause the apparatus to:
transmit, via the control signaling, an indication of a set of preamble sequence configuration parameters, a set of preconfigured preamble sequences, or both; and
transmit, via the first signal and in accordance with the control signaling, a preamble sequence that indicates the first wireless device or the second wireless device is occupying the channel.

24. The apparatus of claim 19, wherein the instructions to transmit the first signal are executable by the at least one processor to cause the apparatus to:
- transmit, via the control signaling, an indication of a set of energy thresholds; and
- transmit, via the first signal and in accordance with the control signaling, the first energy pattern that indicates the first wireless device or the second wireless device is occupying the channel, wherein the first energy pattern is in accordance with at least a first energy threshold of the set of energy thresholds.

25. The apparatus of claim 19, wherein the instructions to transmit the first signal are executable by the at least one processor to cause the apparatus to:
- transmit a second indication of a listen before talk procedure type for the relay device, wherein communicating with the second wireless device via the relay device is based at least in part on the listen before talk procedure type.

26. The apparatus of claim 19, wherein the instructions are further executable by the at least one processor to cause the apparatus to:
- receive, from the relay device, a message that indicates a result of the second listen before talk procedure performed by the relay device; and
- determine whether to communicate with the second wireless device via the relay device based at least in part on the result of the second listen before talk procedure performed by the relay device.

27. The apparatus of claim 18, wherein the instructions to communicate with the second wireless device via the relay device are executable by the at least one processor to cause the apparatus to:
- communicate with the second wireless device via the relay device based at least in part on a preconfigured time offset from the first indication.

28. A method for wireless communications at a relay device, comprising:
- receiving control signaling indicating a channel occupancy time allocated for a first wireless device or a second wireless device and indicating a set of energy patterns, each energy pattern of the set of energy patterns comprising an on-off pattern including one or more on durations associated with a first energy level and one or more off durations associated with a second energy level;
- receiving a first signal comprising a first indication that the first wireless device or the second wireless device is occupying a channel in an unlicensed radio frequency spectrum band, wherein the first indication is based at least in part on the first signal having a first energy pattern of the set of energy patterns;
- performing, by the relay device and based at least in part on receiving the first indication, a listen before talk procedure on the channel during the channel occupancy time allocated for the first wireless device or the second wireless device, wherein the channel is occupied by the first wireless device or the second wireless device during the channel occupancy time; and
- relaying signals between the first wireless device and the second wireless device over the channel during the channel occupancy time based at least in part on the relay device passing the listen before talk procedure and based at least in part on the first indication.

29. The method of claim 28, wherein relaying the signals between the first wireless device and the second wireless device comprises:
- determining to relay the signals in a first relay direction from the first wireless device to the second wireless device, a second relay direction from the second wireless device to the first wireless device, or both based at least in part on the first indication, information acquired by the relay device prior to receiving the first indication, or both; and
- relaying, during the channel occupancy time of the first wireless device or the second wireless device and after passing the listen before talk procedure, the signals in one or both of the first relay direction and the second relay direction based at least in part on the determining.

30. A method for wireless communications at a first wireless device, comprising:
- transmitting control signaling indicating a channel occupancy time for the first wireless device or a second wireless device and indicating a set of energy patterns, each energy pattern of the set of energy patterns comprising an on-off pattern including one or more on durations associated with a first energy level and one or more off durations associated with a second energy level;
- performing a listen before talk procedure on a channel in an unlicensed radio frequency spectrum band during the channel occupancy time allocated for the first wireless device or the second wireless device;
- transmitting a first signal comprising a first indication that the first wireless device is occupying the channel based at least in part on the first wireless device passing the listen before talk procedure, wherein the first indication is based at least in part on the first signal having a first energy pattern of the set of energy patterns; and
- using the channel to communicate with the second wireless device via a relay device based at least in part on transmitting the first indication, wherein transmission of the first indication triggers, at the relay device, a second listen before talk procedure on the channel during the channel occupancy time and based at least in part on the first indication.

\* \* \* \* \*